United States Patent
Holcomb et al.

(10) Patent No.: US 11,202,085 B1
(45) Date of Patent: Dec. 14, 2021

(54) LOW-COST HASH TABLE CONSTRUCTION AND HASH-BASED BLOCK MATCHING FOR VARIABLE-SIZE BLOCKS

(71) Applicant: Microsoft Technology Licensing, LLC, Redmond, WA (US)

(72) Inventors: Thomas W. Holcomb, Sammamish, WA (US); Bin Li, Beijing (CN); Yan Lu, Beijing (CN); Mei-Hsuan Lu, Taipei (TW); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/900,742

(22) Filed: Jun. 12, 2020

(51) Int. Cl.
*H04N 19/192* (2014.01)
*H04N 19/105* (2014.01)
(Continued)

(52) U.S. Cl.
CPC ......... *H04N 19/192* (2014.11); *H04N 19/105* (2014.11); *H04N 19/159* (2014.11); *H04N 19/176* (2014.11); *H04N 19/517* (2014.11)

(58) Field of Classification Search
None
See application file for complete search history.

(56) References Cited

U.S. PATENT DOCUMENTS 2,239,538 A  4/1941 Richter
2,718,173 A  9/1955 Hacman et al.
(Continued)

FOREIGN PATENT DOCUMENTS

CN  1857001  11/2006
CN  1874487  12/2006
(Continued)

OTHER PUBLICATIONS

Wei et al., "An Efficient Intra Mode Selection Algorithm for H.264 Based on Fast Edge Classification," 2007 IEEE Int'l. Symposium on Circuits and Systems, May 22-30, 2007, pp. 3630-3633. (Year: 2007).*

(Continued)

*Primary Examiner* — Reza Aghevli
(74) *Attorney, Agent, or Firm* — Klarquist Sparkman, LLP

(57) ABSTRACT

Innovations in hash table construction and hash-based block matching for image encoding or video encoding are described. For example, an encoder determines hash values for base-size candidate blocks in a reference picture. The encoder stores, in a hash table, the hash values for the base-size candidate blocks. The encoder encodes a trial-size current block in a current picture. In some cases, the trial-size current block has a block size larger than the base block size. As part of the encoding, the encoder uses hash-based block matching, between base-size current blocks of the trial-size current block and the base-size candidate blocks, to identify a trial-size matching block, if any, in the reference picture. The encoder stores hash values only for the base-size candidate blocks. This can significantly reduce the computational cost and memory cost for hash table construction during encoding, without hurting compression efficiency or the overall speed of encoding.

27 Claims, 13 Drawing Sheets software 180 implementing one or more innovations for low-cost hash table construction and hash-based block matching for variable-size blocks during image or video encoding

(51) Int. Cl.
*H04N 19/176* (2014.01)
*H04N 19/517* (2014.01)
*H04N 19/159* (2014.01)

(56) References Cited

U.S. PATENT DOCUMENTS

| | | | |
|---|---|---|---|
| 3,059,528 A | 10/1962 | Allan | |
| 3,142,236 A | 7/1964 | Siegmund et al. | |
| 3,642,351 A | 2/1972 | Tronnier et al. | |
| 4,918,583 A | 4/1990 | Kudo et al. | |
| 5,016,980 A | 5/1991 | Waldron | |
| 5,565,921 A | 10/1996 | Sasaki et al. | |
| 5,610,841 A | 3/1997 | Tanaka et al. | |
| 5,613,004 A | 3/1997 | Cooperman et al. | |
| 5,687,236 A | 11/1997 | Moskowitz et al. | |
| 5,689,365 A | 11/1997 | Takahashi | |
| 5,774,271 A | 6/1998 | Lagerway et al. | |
| 5,850,312 A | 12/1998 | Kato et al. | |
| 6,332,092 B1 | 12/2001 | Deckert et al. | |
| 6,487,440 B2 | 11/2002 | Deckert et al. | |
| 6,618,197 B1 | 9/2003 | Hayakawa | |
| 6,879,266 B1 | 4/2005 | Dye et al. | |
| 6,894,289 B2 | 5/2005 | Nilson et al. | |
| 6,904,110 B2 | 6/2005 | Trans et al. | |
| 6,915,387 B1 | 7/2005 | Huffman et al. | |
| 6,938,128 B1 | 8/2005 | Kuskin et al. | |
| 6,983,020 B2 | 1/2006 | Christiansen | |
| 6,995,918 B2 | 2/2006 | Terasawa et al. | |
| 7,046,460 B2 | 5/2006 | Nozawa | |
| 7,206,346 B2 | 4/2007 | Shimizu et al. | |
| 7,216,232 B1 | 5/2007 | Cox et al. | |
| 7,239,454 B2 | 7/2007 | Kobayashi et al. | |
| 7,325,141 B2 | 1/2008 | Chow et al. | |
| 7,328,153 B2 | 2/2008 | Wells et al. | |
| 7,349,583 B2 | 3/2008 | Kumar et al. | |
| 7,379,499 B2 | 5/2008 | Dahlhoff et al. | |
| 7,400,774 B2 | 7/2008 | Puri et al. | |
| 7,421,128 B2 | 9/2008 | Venkatesan et al. | |
| 7,430,670 B1 | 9/2008 | Horning et al. | |
| 7,466,418 B2 | 12/2008 | Nilson et al. | |
| 7,606,974 B2 | 10/2009 | Dai et al. | |
| 7,609,763 B2 | 10/2009 | Mukerjee et al. | |
| 7,613,364 B2 | 11/2009 | Kang et al. | |
| 7,636,824 B1 | 12/2009 | Tormasov | |
| 7,672,005 B1 | 3/2010 | Hobbs et al. | |
| 7,702,127 B2 | 4/2010 | Mihcak et al. | |
| 7,706,682 B2 | 4/2010 | Keller et al. | |
| 7,733,497 B2 | 6/2010 | Yun et al. | |
| 7,747,584 B1 | 6/2010 | Jernigan, IV | |
| 7,761,712 B2 | 7/2010 | Moskowitz et al. | |
| 7,868,792 B2 | 1/2011 | Artan et al. | |
| 7,870,393 B2 | 1/2011 | Moskowitz et al. | |
| 7,873,786 B1 | 1/2011 | Singh et al. | |
| 7,912,244 B2 | 3/2011 | Mihcak et al. | |
| 7,949,186 B2 | 5/2011 | Grauman et al. | |
| 7,986,844 B2 | 7/2011 | Diamant et al. | |
| 8,003,186 B2 | 8/2011 | Ishizaki et al. | |
| 8,005,142 B2 | 8/2011 | Kim et al. | |
| 8,041,677 B2 | 10/2011 | Sumner et al. | |
| 8,077,989 B1 | 12/2011 | Hobbs et al. | |
| 8,086,052 B2 | 12/2011 | Toth et al. | |
| 8,099,415 B2 | 1/2012 | Luo et al. | |
| 8,099,601 B2 | 1/2012 | Serret-Avila et al. | |
| 8,107,527 B1 | 1/2012 | Hobbs et al. | |
| 8,126,282 B2 | 2/2012 | Jung et al. | |
| 8,197,397 B2 | 6/2012 | Rovegno | |
| 8,213,503 B2 | 7/2012 | Tu et al. | |
| 8,213,515 B2 | 7/2012 | Kudana et al. | |
| 8,264,489 B2 | 9/2012 | Saint-Hilaire et al. | |
| 8,284,484 B2 | 10/2012 | Hoult et al. | |
| 8,295,617 B2 | 10/2012 | Collins | |
| 8,320,683 B2 | 11/2012 | Konishi | |
| 8,335,255 B2 | 12/2012 | Lee et al. | |
| 8,355,437 B2 | 1/2013 | Hannuksela | |
| 8,411,750 B2 | 4/2013 | Dane | |
| 8,417,039 B2 | 4/2013 | Albu et al. | |
| 8,442,942 B2 | 5/2013 | Leppard | |
| 8,515,123 B2 | 8/2013 | Thorwirth | |
| 8,619,857 B2 | 12/2013 | Zhao et al. | |
| 8,644,620 B1 | 2/2014 | Lam | |
| 8,681,870 B2 | 3/2014 | Takada | |
| 8,787,460 B1 | 7/2014 | Hobbs | |
| 8,897,512 B1 | 11/2014 | Bozinovic et al. | |
| 9,167,020 B2 | 10/2015 | Abdo et al. | |
| 9,223,534 B1 | 12/2015 | Eilam | |
| 9,225,979 B1 | 12/2015 | Jia et al. | |
| 9,235,313 B2 | 1/2016 | Wu et al. | |
| 9,277,237 B2 | 3/2016 | Abiezzi et al. | |
| 9,286,862 B2 | 3/2016 | Peacock | |
| 9,332,270 B2 | 5/2016 | Ju | |
| 10,701,385 B1 * | 6/2020 | Xu | H04N 19/96 |
| 10,917,493 B2 * | 2/2021 | Godinez | H04L 65/4084 |
| 2001/0001614 A1 | 5/2001 | Boice et al. | |
| 2002/0041629 A1 | 4/2002 | Hannuksela | |
| 2002/0118755 A1 | 8/2002 | Karczewicz et al. | |
| 2003/0169918 A1 | 9/2003 | Sogawa | |
| 2003/0179206 A1 | 9/2003 | Emerson et al. | |
| 2003/0179951 A1 | 9/2003 | Christiansen | |
| 2003/0187587 A1 | 10/2003 | Swindells et al. | |
| 2004/0131014 A1 | 7/2004 | Thompson et al. | |
| 2004/0133548 A1 | 7/2004 | Fielding et al. | |
| 2004/0174570 A1 | 9/2004 | Plunkett et al. | |
| 2004/0223549 A1 | 11/2004 | Karczewicz et al. | |
| 2005/0060643 A1 | 3/2005 | Glass et al. | |
| 2005/0166040 A1 | 7/2005 | Walmsley | |
| 2006/0062303 A1 | 3/2006 | Xu | |
| 2006/0132931 A1 | 6/2006 | Epple et al. | |
| 2006/0153295 A1 | 7/2006 | Wang et al. | |
| 2006/0179388 A1 * | 8/2006 | Choi | H04N 19/44 714/746 |
| 2006/0224594 A1 | 10/2006 | Goyal et al. | |
| 2007/0025442 A1 | 2/2007 | Okada et al. | |
| 2007/0036226 A1 | 2/2007 | Kim et al. | |
| 2007/0041066 A1 | 2/2007 | Yasuda et al. | |
| 2007/0053662 A1 | 3/2007 | Tobita et al. | |
| 2007/0086526 A1 | 4/2007 | Koto et al. | |
| 2007/0092147 A1 | 4/2007 | Guionnet et al. | |
| 2007/0116110 A1 * | 5/2007 | Diamant | H04N 19/507 375/240 |
| 2007/0199011 A1 | 8/2007 | Zhang et al. | |
| 2007/0217702 A1 | 9/2007 | Sung | |
| 2008/0104652 A1 | 5/2008 | Swenson et al. | |
| 2008/0212687 A1 | 9/2008 | Liu | |
| 2008/0259089 A1 * | 10/2008 | Matsubara | G06F 12/0875 345/545 |
| 2009/0022374 A1 | 1/2009 | Boult | |
| 2009/0115909 A1 | 5/2009 | Walls et al. | |
| 2009/0129466 A1 | 5/2009 | Cho et al. | |
| 2009/0244299 A1 | 10/2009 | Fukunishi | |
| 2010/0057750 A1 | 3/2010 | Aasted et al. | |
| 2010/0119170 A1 | 5/2010 | Sengamedu et al. | |
| 2010/0166073 A1 | 7/2010 | Schmit et al. | |
| 2010/0177893 A1 | 7/2010 | Jeon et al. | |
| 2010/0268836 A1 | 10/2010 | Jabri et al. | |
| 2010/0284460 A1 | 11/2010 | Tsai et al. | |
| 2010/0284471 A1 | 11/2010 | Tsai et al. | |
| 2010/0293248 A1 | 11/2010 | Kamay et al. | |
| 2011/0007801 A1 | 1/2011 | Andersson et al. | |
| 2011/0010396 A1 | 1/2011 | Zhou | |
| 2011/0044551 A1 | 2/2011 | Lee et al. | |
| 2011/0051809 A1 | 3/2011 | Lee | |
| 2011/0128810 A1 | 6/2011 | Sato | |
| 2011/0179341 A1 | 7/2011 | Falls et al. | |
| 2011/0225114 A1 | 9/2011 | Gotthardt | |
| 2011/0243234 A1 | 10/2011 | Kondo et al. | |
| 2011/0293013 A1 | 12/2011 | Ma et al. | |
| 2011/0299785 A1 | 12/2011 | Albu et al. | |
| 2011/0311042 A1 | 12/2011 | Cheddad et al. | |
| 2012/0057631 A1 | 3/2012 | Le Leannec | |
| 2012/0128064 A1 | 5/2012 | Sato | |
| 2012/0170653 A1 | 7/2012 | Panusopone et al. | |
| 2012/0213282 A1 | 8/2012 | Choi et al. | |
| 2012/0245688 A1 | 9/2012 | Vanaclocha | |
| 2012/0294523 A1 | 11/2012 | Abdo et al. | |

(56) References Cited

U.S. PATENT DOCUMENTS

| | | | |
|---|---|---|---|
| 2013/0013618 A1 | 1/2013 | Heller et al. | |
| 2013/0022113 A1 | 1/2013 | Chen et al. | |
| 2013/0034158 A1 | 2/2013 | Kirchhoffer et al. | |
| 2013/0034159 A1 | 2/2013 | Siekmann et al. | |
| 2013/0036289 A1 | 2/2013 | Welnicki et al. | |
| 2013/0057646 A1 | 3/2013 | Chen et al. | |
| 2013/0057666 A1 | 3/2013 | Fujii | |
| 2013/0067344 A1 | 3/2013 | Ungureanu et al. | |
| 2013/0078592 A1 | 3/2013 | McCarthy | |
| 2013/0084018 A1 | 4/2013 | Nystad | |
| 2013/0114704 A1 | 5/2013 | Chen et al. | |
| 2013/0142447 A1 | 6/2013 | Park et al. | |
| 2013/0147974 A1 | 6/2013 | Ju et al. | |
| 2013/0148721 A1 | 6/2013 | Chen et al. | |
| 2013/0176560 A1 | 7/2013 | Wax et al. | |
| 2013/0208810 A1 | 8/2013 | Shen et al. | |
| 2013/0243089 A1 | 9/2013 | Lim et al. | |
| 2013/0258052 A1 | 10/2013 | Li et al. | |
| 2013/0266073 A1 | 10/2013 | MacInnis et al. | |
| 2013/0266078 A1 | 10/2013 | Deligiannis et al. | |
| 2013/0268621 A1 | 10/2013 | Mese et al. | |
| 2013/0271565 A1 | 10/2013 | Chen et al. | |
| 2013/0272394 A1 | 10/2013 | Brockmann et al. | |
| 2013/0279564 A1 | 10/2013 | Wang | |
| 2013/0279577 A1 | 10/2013 | Schwarz et al. | |
| 2013/0279806 A1 | 10/2013 | Tonisson et al. | |
| 2013/0308704 A1* | 11/2013 | Park | H04N 19/167 375/240.16 |
| 2013/0335527 A1 | 12/2013 | Takahashi et al. | |
| 2014/0002603 A1 | 1/2014 | Takahashi et al. | |
| 2014/0003506 A1 | 1/2014 | Wang et al. | |
| 2014/0010294 A1 | 1/2014 | Ye et al. | |
| 2014/0016698 A1 | 1/2014 | Joshi et al. | |
| 2014/0029668 A1 | 1/2014 | Lim et al. | |
| 2014/0050413 A1 | 2/2014 | Sato | |
| 2014/0064360 A1 | 3/2014 | Rapaka et al. | |
| 2014/0092994 A1 | 4/2014 | Wang | |
| 2014/0279985 A1* | 9/2014 | Fontenot | G06F 8/65 707/698 |
| 2014/0321553 A1 | 10/2014 | Clark | |
| 2014/0369413 A1 | 12/2014 | Clark | |
| 2014/0369421 A1 | 12/2014 | Zhu et al. | |
| 2015/0054946 A1 | 2/2015 | Zhang | |
| 2015/0063451 A1 | 3/2015 | Zhu et al. | |
| 2015/0092840 A1 | 4/2015 | Mochizuki et al. | |
| 2015/0261884 A1 | 9/2015 | Pang et al. | |
| 2016/0125242 A1 | 5/2016 | Hawkins | |
| 2016/0234530 A1 | 8/2016 | Xu et al. | |
| 2016/0241876 A1 | 8/2016 | Xu et al. | |
| 2016/0269732 A1 | 9/2016 | Li et al. | |
| 2016/0277733 A1 | 9/2016 | Li et al. | |
| 2016/0277761 A1 | 9/2016 | Li et al. | |
| 2017/0163999 A1 | 6/2017 | Li et al. | |
| 2017/0302936 A1 | 10/2017 | Li et al. | |
| 2017/0339391 A1* | 11/2017 | Zhou | H04L 65/607 |
| 2018/0063540 A1 | 3/2018 | Zhu et al. | |
| 2018/0152699 A1 | 5/2018 | Kumar et al. | |
| 2018/0196609 A1* | 7/2018 | Niesen | G06F 16/1752 |
| 2018/0254898 A1* | 9/2018 | Sprague | H04L 9/3271 |
| 2019/0089977 A1* | 3/2019 | Park | H04N 19/50 |
| 2019/0124339 A1* | 4/2019 | Young | H04N 19/176 |
| 2020/0099926 A1* | 3/2020 | Tanner | H04N 19/105 |
| 2020/0099941 A1* | 3/2020 | Li | H04N 19/159 |
| 2020/0099953 A1* | 3/2020 | Xu | H04N 19/593 |
| 2020/0128265 A1* | 4/2020 | Xu | H04N 19/159 |
| 2020/0228814 A1* | 7/2020 | Xu | H04N 19/132 |
| 2020/0252605 A1* | 8/2020 | Xu | H04N 19/176 |
| 2020/0322644 A1* | 10/2020 | Wu | H04N 19/167 |
| 2020/0329248 A1* | 10/2020 | Wu | H04N 19/593 |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| CN | 106415607 | 2/2017 |
| CN | 105981382 | 5/2019 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010-508734 | 3/2010 |
| JP | 2013-058873 | 3/2013 |
| RU | 2298226 | 4/2007 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | WO 2011/103206 | 8/2011 |
| WO | WO 2011/153005 | 12/2011 |
| WO | WO 2013/055923 | 4/2013 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

Wige et al., "Hash Image Transform for Accelerated Screen Content Editing in HEVC," IEEE 2016 Picture Coding Symposium (PCS), Dec. 4-7, 2016, pp. 1-5. (Year: 2016).*
Ascenso et al., "Adaptive Hash-Based Side Information Exploitation for Efficient Wyner-Ziv Video Coding," *IEEE Int'l Conf. on Image Processing*, 4 pp. (Sep. 2007).
Bankoski et al., "VP8 Data Format and Decoding Guide," RFC 6386, 304 pp. (Nov. 2011).
Brasnett et al., "Comments & Results on MPEG-7 Image Signature," MPEG2008/M15863, 4 pp. (Oct. 2008).
Chen et al., "Description of Screen Content Coding Technology Proposal by Qualcomm," JCTVC-Q0031, 18 pp. (Mar. 2014).
Chum et al., "Scalable Near Identical Image and Shot Detection," *Proceedings of International Conference on Image and Video Retrieval*, Jul. 9, 2007, pp. 549-556.
Communication pursuant to Article 94(3) EPC dated Aug. 25, 2016, from European Patent Application No. 13895864.0, 7 pp.
Communication pursuant to Article 94(3) EPC dated Feb. 8, 2017, from European Patent Application No. 14884278.4, 5 pp.
Communication pursuant to Article 94(3) dated Jul. 6, 2017, from European Patent Application No. 14895767.3, 8 pp.
Communication pursuant to Article 94(3) dated Jun. 14, 2017, from European Patent Application No. 14885049.8, 7 pp.
Communication pursuant to Article 94(3) EPC dated Apr. 5, 2017, from European Patent Application No. 13895864.0, 4, pp.
Communication pursuant to Article 94(3) EPC dated Jan. 10, 2018, from European Patent Application No. 13895864.0, 4 pp.
Communication pursuant to Article 94(3) EPC dated Mar. 15, 2018, from European Patent Application No. 14895767.3, 5 pp.
Communication pursuant to Article 94(3) EPC dated Apr. 4, 2018, from European Patent Application No. 13896175.0, 6 pp.
Communication pursuant to Article 94(3) EPC dated May 24, 2018, from European Patent Application No. 13895864.0, 5 pp.
Communication pursuant to Rule 164(1) EPC dated Feb. 16, 2017, from European Patent Application No. 14885049.8, 7 pp.
Communication pursuant to Article 94(3) EPC dated Feb. 16, 2018, from European Patent Application No. 14903205.4, 11 pp.
Communication under Rule 71(3) EPC dated Feb. 22, 2019, from European Patent Application No. 14895767.3, 5 pp.

(56) References Cited

OTHER PUBLICATIONS

Communication under Rule 71(3) EPC dated Jul. 12, 2019, from European Patent Application No. 13896175.0, 7 pp.
Communication under Rule 71(3) EPC dated Jan. 28, 2020, from European Patent Application No. 14885049.8, 7 pp.
Decision to Grant dated Jul. 4, 2019, from European Patent Application No. 14895767.3, 2 pp.
Decision to Grant dated Nov. 14, 2019, from European Patent Application No. 13896175.0, 2 pp.
Extended European Search Report dated Aug. 21, 2018, from European Patent Application No. 18176302.0, 5 pp.
Examination Report dated Sep. 29, 2016, from European Patent Application No. 13896175.0, 8 pp.
Examination Report No. 1 dated Mar. 14, 2019, from Australian Patent Application No. 2014408223, 4 pp.
Examination Report No. 2 dated Jun. 3, 2019, from Australian Patent Application No. 2014408223, 3 pp.
Extended European Search Report dated Nov. 28, 2019, from European Patent Application No. 19182387.7, 12 pp.
Final Office Action dated Apr. 6, 2018, from U.S. Appl. No. 15/024,812, 123 pp.
Final Office Action dated Apr. 9, 2018, from U.S. Appl. No. 15/321,536, 58 pp.
Final Office Action dated Nov. 21, 2018, from U.S. Appl. No. 15/029,589, 50 pp.
Final Office Action dated Apr. 16, 2019, from U.S. Appl. No. 15/024,816, 73 pp.
Final Office Action dated May 10, 2019, from U.S. Appl. No. 15/321,536, 63 pp.
Final Office Action dated Oct. 4, 2019, from U.S. Appl. No. 15/508,067, 16 pp.
Final Office Action dated Feb. 26, 2020, from U.S. Appl. No. 15/365,927, 18 pp.
First Examination report dated Feb. 18, 2020, from Indian Patent Application No. 201647011539, 6 pp.
First Office Action and Search Report dated Jul. 19, 2018, from Chinese Patent Application No. 201480071892.2, 10 pp.
Flynn et al., "High Efficiency Video Coding (HEVC) Range Extensions text specification: May 12, 2017 4," JCTVC-N1005, 322 pp. (Apr. 2013).
Flynn et al., "High Efficiency Video Coding (HEVC) Range Extensions text specification: May 12, 2017 6," JCTVC-P1005_v1, 355 pp. (Jan. 2014).
Gaikar, "Techinline Remote Desktop Software: Access Your Computers Remotely," *Tricks Machine*, 6 pp. (Jan. 2012).
Gargi et al., "Performance Characterization of Video-Shot-Change Detection Methods," A175, vol. 10, Issue 1, Feb. 1, 2000, 13 Pages.
International Preliminary Report on Patentability dated May 6, 2016, from International Patent Application No. PCT/CN2013/085939, 6 pp.
International Preliminary Report on Patentability dated May 6, 2016, from International Patent Application No. PCT/CN2013/085937, 7 pp.
International Preliminary Report on Patentability dated Sep. 15, 2016, from International Patent Application No. PCT/CN2014/072834, 6 pp.
International Preliminary Report on Patentability dated Sep. 15, 2016, from International Patent Application No. PCT/CN2014/072827, 6 pp.
International Preliminary Report on Patentability dated Jan. 5, 2017, from International Patent Application No. PCT/CN2014/080481, 7 pp.
International Preliminary Report on Patentability dated Apr. 13, 2017, from International Patent Application No. PCT/CN2014/087869, 6 pp.
International Search Report and Written Opinion dated Jun. 10, 2014, from International Patent Application No. PCT/CN2013/085937, 12 pp.
International Search Report and Written Opinion dated Jul. 30, 2014, from International Patent Application No. PCT/CN2013/085939, 12 pp.
International Search Report and Written Opinion dated Dec. 10, 2014, from International Patent Application No. PCT/CN2014/072827, 12 pp.
International Search Report and Written Opinion dated Dec. 3, 2014, from International Patent Application No. PCT/CN2014/072834, 13 pp.
International Search Report and Written Opinion dated Mar. 2, 2015, from International Patent Application No. PCT/CN2014/080481, 13 pp.
International Search Report and Written Opinion dated Jul. 1, 2015, from International Patent Application No. PCT/CN2014/087869, 12 pp.
International Search Report and Written Opinion dated May 3, 2018, from International Patent Application No. PCT/US2017/063164, 30 pp.
International Search Report and Written Opinion dated Jan. 24, 2018, from International Patent Application No. PCT/US2017/057066, 12 pp.
Invitation pursuant to Article 94(3) and Rule 71(1) EPC dated May 31, 2017, from European Patent Application No. 14884278.4, 3 pp.
Invitation pursuant to Article 94(3) and Rule 71(1) EPC dated Oct. 26, 2017, from European Patent Application No. 14885049.8, 5 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p×64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Kwon et al., "AHG5: Fast Encoding Using Early Skipping of Intra Block Copy (IntraBC) Search," JCTVC-O0245, 9 pp. (Oct. 2013).
Li et al., "A Unified Framework of Hash-based Matching for Screen Content Coding," *IEEE VCIP*, pp. 530-533 (Dec. 2014).
Li et al., "Adaptive Motion Vector Resolution for Screen Content," JCTVC-R0106 r1, ITU-T SG16 WP 3 and ISO/IEC JTC1/SC29/WG11, 18th Meeting, 16 pp. (Jun. 2014).
Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Li et al., "Hash-based motion search," JCTVC-Q0245, 5 pp. (Mar. 2014).
Li et al., "Improvement for hash based inter search," JCTVC-S0089, 4 pp. (Oct. 2014).
Li et al., "Low complexity encoders for JCTVC-Q0035," JCTVC-Q0052, 4 pp. (Mar. 2014).
Li et al., "RDPCM operation unification and cleanup," JCTVC-O0185, pp. 1-6 (Oct. 2013).
Li et al., "Screen Content Coding Using Dictionary Based Mode," JCTVC-P0214_r1, 5 pp. (Jan. 2014).
Liu et al., "Motion Feature and Hadamard Coefficient-Based Fast Multiple Reference Frame Motion Estimation for H.264," *IEEE Trans. On Circuits and Systems for Video Technology*, vol. 18, No. 5, pp. 620-632 (May 2008).
Monga et al., "Perceptual Image Hashing Via Feature Points: Performance Evaluation and Tradeoffs," *IEEE Transactions Image Processing*, pp. 3452-3465 (Nov. 2006).

(56) References Cited

OTHER PUBLICATIONS

Notice of Allowance dated Oct. 23, 2018, from U.S. Appl. No. 15/253,568, 8 pp.
Notice of Allowance dated Oct. 9, 2019, from U.S. Appl. No. 15/029,589, 14 pp.
Notice of Allowance dated Jan. 29, 2020, from U.S. Appl. No. 15/321,536, 11 pp.
Notice on Grant of Patent dated Jun. 5, 2018, from Chinese Patent Application No. 201380080482.X, 4 pp.
Notice on Grant of Patent dated Apr. 4, 2019, from Chinese Patent Application No. 201480048046.9, 4 pp.
Notice on Grant of Patent dated Apr. 18, 2019, from Chinese Patent Application No. 201480029780.0, 4 pp.
Notice on Grant of Patent dated May 14, 2019, from Chinese Patent Application No. 201380080483.4, 4 pp.
Notice on Grant of Patent dated May 29, 2019, from Chinese Patent Application No. 201480030627.X, 4 pp.
Notice on the First Office Action dated Jun. 2, 2017, from Chinese Patent Application No. 201380080482.X, 13 pp.
Notice on the First Office Action dated Jan. 17, 2018, from Chinese Patent Application No. 201480030627.X, 14 pp.
Notice on the First Office Action dated Feb. 5, 2018, from Chinese Patent Application No. 201480029780.0, 14 pp.
Notice on the First Office Action dated Mar. 20, 2018, from Chinese Patent Application No. 201380080483.4, 12 pp.
Notice on the First Office Action dated May 3, 2018, from Chinese Patent Application No. 201480048046.9, 12 pp.
Notice on the Second Office Action dated Jan. 4, 2018, from Chinese Patent Application No. 201380080482.X, 7 pp.
Notice on the Second Office Action dated Sep. 29, 2018, from Chinese Patent Application No. 201480030627.X, 13 pp.
Notice on the Second Office Action dated Oct. 29, 2018, from Chinese Patent Application No. 201480029780.0, 11 pp.
Notice on Second Office Action dated Nov. 29, 2018, from Chinese Patent Application No. 201380080483.4, 6 pp.
Notice on the Second Office Action dated Jan. 23, 2019, from Chinese Patent Application No. 201480048046.9, 6 pp.
Notice on the Third Office Action dated Mar. 13, 2019, from Chinese Patent Application No. 201480030627.X, 6 pp.
Office Action dated May 1, 2018, from U.S. Appl. No. 15/253,568, 7 pp.
Office Action dated Jul. 31, 2018, from U.S. Appl. No. 15/029,589, 45 pp.
Office Action dated Aug. 27, 2018, from U.S. Appl. No. 15/365,927, 22 pp.
Office action dated Jul. 12, 2018, from Russian Patent Application No. 2017110461, 7 pp.
Office action dated Jun. 26, 2018, from Japanese Patent Application No. 2017-517045, 7 pp.
Office Action dated Oct. 4, 2017, from U.S. Appl. No. 15/024,812, 75 pp.
Office Action dated Sep. 28, 2017, from U.S. Appl. No. 15/024,816, 45 pp.
Office Action dated Oct. 2, 2017, from U.S. Appl. No. 15/024,816, 44 pp.
Office Action dated Oct. 1, 2018, from U.S. Appl. No. 15/024,816, 59 pp.
Office Action dated Oct. 13, 2017, from U.S. Appl. No. 15/321,536, 52 pp.
Office Action dated Oct. 9, 2018, from U.S. Appl. No. 15/321,536, 65 pp.
Office Action dated Oct. 19, 2018, from U.S. Appl. No. 15/029,585, 49 pp.
Office Action dated Nov. 6, 2017, from U.S. Appl. No. 15/029,585, 51 pp.
Office Action dated Mar. 12, 2019, from U.S. Appl. No. 15/029,589, 79 pp.
Office Action dated Jun. 28, 2019, from U.S. Appl. No. 15/508,067, 18 pp.
Office Action dated Apr. 13, 2020, from U.S. Appl. No. 15/508,067, 18 pp.
Office Action dated Sep. 17, 2019, from Mexican Patent Application No. MX/a/2017/004210, 5 pp.
Office Action dated Feb. 13, 2020, from Korean Patent Application No. 10-2016-7013774, 9 pp.
Office Action dated Feb. 27, 2020, from Mexican Patent Application No. MX/a/2017/004210, 6 pp.
Office Action dated Mar. 25, 2020, from Korean Patent Application No. 10-2016-7027484, 13 pp.
Pauleve et al., "Locality Sensitive Hashing: A Comparison of Hash Function Types and Querying Mechanisms," *Pattern Recognition Letters*, vol. 31, No. 11, pp. 1348-1358 (Aug. 2010).
Praveen et al., "Analysis and Approximation of SAO Estimation for CTU-Level HEVC Encoder," *Proc. Of Visual Communications and Image Processing*, 5 pp. (Nov. 2013).
Rane, "Hash-Aided Motion Estimation and Rate Control for Distributed Video Coding," EE392J Project Report, 10 pp. (Dec. 2004).
Rapaka et al., "Improved Intra Block Copy and Motion Search Methods for Screen Content Coding," *Visual Communications and Image Procsesing*, vol. 9599, pp. (Sep. 2015).
Ribas-Corbera et al., "Optimizing Motion-Vector Accuracy in Block-Based Video Coding," *IEEE Trans. On Circuits and Systems for Video Technology*, vol. 11, No. 4, pp. 497-511 (Apr. 2001).
Riguer et al., "Real-Time Depth of Field Simulation," *ShaderX2: Shader Programming Tips and Tricks with DirectX 9*, pp. 1-30 (Jan. 2003).
Robert et al., "Improving Intra mode coding in H.264/AVC through block oriented transforms," *IEEE 8th Workshop on Multimedia Signal Processing*, 5 pp. (Oct. 2006).
Sangi et al., "Global Motion Estimation Using Block Matching with Uncertainty Analysis," *Signal Processing Conference*, pp. 1823-1827 (Sep. 2007).
Search Report dated Sep. 27, 2018, from European Patent Application No. 18176304.6, 8 pp.
Shah et al., "HD Resolution Intra Prediction Architecture for H.264 Decoder," *IEEE Int'l Conf. on VLSI Design*, pp. 107-112 (Jan. 2012).
SMPTE Standard, "VC-1 Compressed Video Bitstream Format and Decoding Process," SMPTE 421M-2006, 493 pp. (Feb. 2006).
Sun et al., "Motion-Embedded Residual Error for Packet Loss Recovery of Video Transmission and Encryption," *Visual Communications and Image Processing*, vol. 6077, 14 pp. (Jan. 2006).
Supplementary European Search Report dated Jul. 5, 2016, from European Patent Application No. 13895864.0, 4 pp.
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated May 18, 2017, from European Patent Application No. 14885049.8, 6 pp.
Supplementary European Search Report dated Jun. 14, 2017, from European Patent Application No. 14895767.3, 5 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Tagliasacchi et al., "Hash-Based Motion Modeling in Wyner-Ziv Video Coding," *IEEE Int'l Conf. on Acoustics, Speech, and Signal Processing*, 4 pp. (Apr. 2007).
Wei et al., "An Efficient Intra-Mode Selection Algorithm for H.264 Based on Edge Classification and Rate-Distortion Estimation," Signal Processing: Image Communication vol. 23, No. 9, pp. 699-710, Oct. 1, 2008 (retrieved Aug. 22, 2008).
Wikipedia, "Locality-sensitive Hashing" 6 pp. (document marked: "last modified on Apr. 18, 2013").
Wikipedia, "Locality-sensitive Hashing" 7 pp. (document marked: "last edited on Feb. 6, 2018").
Wu et al., "Linear Hashtable Method Predicted Hexagonal Search Algorithm with Spatial Related Criterion," *Lecture Notes in Computer Science*, pp. 1208-1217 (Jun. 2005).
Xiao et al., "Bottom-Up Hash Value Calculation and Validity Check for SCC," JCTVC-W0078, 5 pp. (Feb. 2016).

(56) References Cited

OTHER PUBLICATIONS

Yang et al., "MyFinder: Near-Duplicate Detection for Large Image Collections," *ACM Int'l Conf. on Multimedia*, pp. 1013-1014 (Oct. 2009).
Yu et al., "New Intra Prediction Using Intra-Macroblock Motion Compensation," JVT-C151, 10 pp. (May 2002).
Zhou et al., "Motion Vector Resolution Control for Screen Content Coding," JCTVC-P0277, 6 pp. (Jan. 2014).
Zhu et al., "2-D Dictionary Based Video Coding for Screen Contents," *Data Compression Conf.*, pp. 43-52 (Mar. 2014).
Zhu et al., "Screen Content Coding Using 2-D Dictionary Mode," JCTVC-O0355, 4 pp. (Oct. 2013).
Zhu et al., "Screen Content Coding Using 2-D Dictionary Mode," JCTVC-O0357, 4 pp. (Oct. 2013).
Advisory Action dated Jun. 5, 2020, from U.S. Appl. No. 15/365,927, 3 pp.
Communication under Rule 71(3) EPC dated Oct. 22, 2020, from European Patent Application No. 19182387.1, 7 pp.
Final Office Action dated Oct. 6, 2020, from U.S. Appl. No. 15/508,067, 20 pp.
First Examination Report dated Jul. 22, 2020, from Indian Patent Application No. 201647028907, 6 pp.
First Examination Report dated Jul. 10, 2020, from Indian Patent Application No. 201747008172, 7 pp.
First Examination Report dated Sep. 20, 2020, from Indian Patent Application No. 201647043576, 7 pp.
Notice of Allowance dated Aug. 25, 2020, from Korean Patent Application No. 10-2016-7027484, 6 pp.
Notice of Allowance dated Sep. 24, 2020, from Korean Patent Application No. 10-2016-7013774, 6 pp.
Office Action dated Jun. 28, 2020, from Brazilian Patent Application No. BR112017004490-0, 5 pp.
Office Action dated Sep. 16, 2020, from Korean Patent Application No. 10-2017-7011764, 11 pp.
Office Action dated Sep. 21, 2020, from Mexican Patent Application No. MX/a/2017/004210, 6 pp.
Decision to Grant dated Jan. 21, 2021, from European Patent Application No. 19182387.1, 2 pp.
Examiner's Report dated Nov. 6, 2020, from Canadian Patent Application No. 2,961,089, 3 pp.
Examiner's Report dated Jun. 11, 2021, from Canadian Patent Application No. 2,961,089, 4 pp.
Notice of Allowance dated Mar. 17, 2021, from U.S. Appl. No. 15/024,816, 11 pp.
Notice of Allowance dated Apr. 13, 2021, from U.S. Appl. No. 15/365,927, 5 pp.
Notice of Allowance dated May 3, 2021, from Korean Patent Application No. 10-2017-7002065, 6 pp.
Office Action dated Dec. 24, 2020, from U.S. Appl. No. 15/365,927, 6 pp.
Office Action dated Feb. 19, 2021, from Korean Patent Application No. 10-2017-7002065, 6 pp.
Office Action dated Mar. 25, 2021, from Korean Patent Application No. 10-2017-7011764, 14 pp.

* cited by examiner software 180 implementing one or more innovations for low-cost hash table construction and hash-based block matching for variable-size blocks during image or video encoding

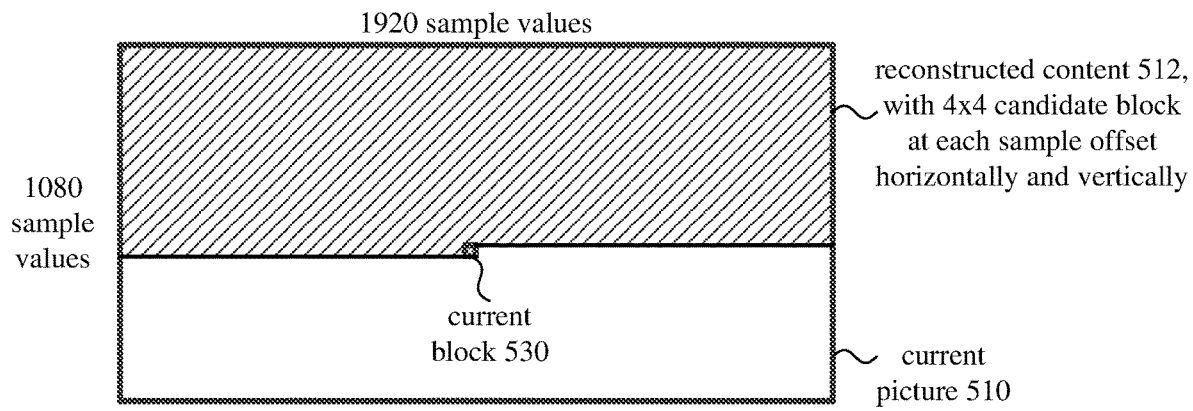

500

1920 sample values 1080 sample values reconstructed content 512, with 4x4 candidate block at each sample offset horizontally and vertically current block 530 current picture 510 number of 4x4 candidate blocks for block vector estimation for 4x4 current block at position (896, 576):

(576 - 4 + 1) x (1920 - 4 + 1) + (896 - 4 + 1) = 1,099,334

FIG. 6 hash table 600

$h_0$ : $entry_0$, $entry_1$, $entry_2$, $entry_3$, $entry_4$, . . . — list 610 of candidate blocks with hash index $h_0$ $h_1$ : $entry_0$, $entry_1$, $entry_2$ $h_2$ :

$h_3$ : $entry_0$, $entry_1$, $entry_2$, $entry_3$ — list 613 of candidate blocks with hash index $h_3$

.
.
.

$h_{J-1}$ : $entry_0$, $entry_1$, $entry_2$, $entry_3$, $entry_4$, . . . — list 619 of candidate blocks with hash index $h_{J-1}$ $entry_x$ includes, e.g., the address of a given candidate block, and a check value for the given candidate block $hash(current\_block) = h_3$
use list 613

FIG. 7

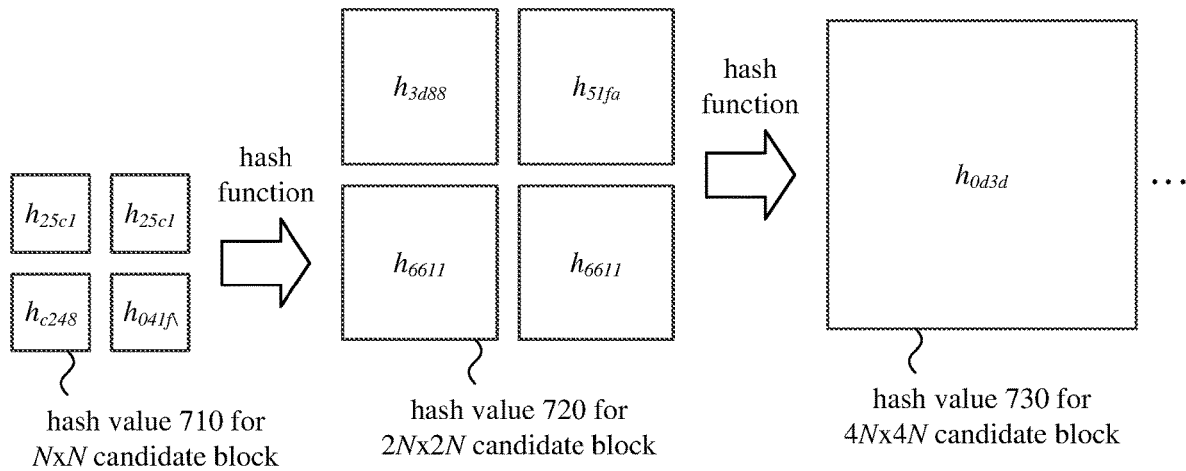

hash value 710 for  
$N \times N$ candidate block hash value 720 for  
$2N \times 2N$ candidate block hash value 730 for  
$4N \times 4N$ candidate block

FIG. 8 hash table 810 for $N \times N$ candidate blocks $h_0$: $entry_0$, $entry_1$, $entry_2$, $entry_3$, ...

$h_1$: $entry_0$ $h_2$: $entry_0$, $entry_1$, $entry_2$ $h_3$: $entry_0$, $entry_1$, $entry_2$, $entry_3$, ...

.
.
.

$h_{J-1}$: $entry_0$, $entry_1$ hash table 820 for $2N \times 2N$ candidate blocks $h_0$: $entry_0$ $h_1$: $entry_0$, $entry_1$, $entry_2$, $entry_3$, ...

$h_2$:

$h_3$: $entry_0$, $entry_1$, $entry_2$

.
.
.

$h_{J-1}$: $entry_0$, $entry_1$, $entry_2$

4 NxN current blocks of 2Nx2N current block 901

| $h_{5600}$ | $h_{6104}$ |
| --- | --- |
| $h_{9299}$ | $h_{9299}$ |

16 NxN current blocks of 4Nx4N current block 902

| $h_{5600}$ | $h_{6104}$ | $h_{6104}$ | $h_{84df}$ |
| --- | --- | --- | --- |
| $h_{9299}$ | $h_{9299}$ | $h_{9299}$ | $h_{84df}$ |
| $h_{9299}$ | $h_{9299}$ | $h_{9299}$ | $h_{84df}$ |
| $h_{a9f9}$ | $h_{a9f9}$ | $h_{1bc4}$ | $h_{d91f}$ |

64 NxN current blocks of 8Nx8N current block 903

| $h_{5600}$ | $h_{6104}$ | $h_{6104}$ | $h_{84df}$ | $h_{84df}$ | $h_{84df}$ | $h_{84df}$ | $h_{84df}$ |
| --- | --- | --- | --- | --- | --- | --- | --- |
| $h_{9299}$ | $h_{9299}$ | $h_{9299}$ | $h_{84df}$ | $h_{84df}$ | $h_{84df}$ | $h_{84df}$ | $h_{84df}$ |
| $h_{9299}$ | $h_{9299}$ | $h_{9299}$ | $h_{84df}$ | $h_{84df}$ | $h_{84df}$ | $h_{84df}$ | $h_{84df}$ |
| $h_{a9f9}$ | $h_{a9f9}$ | $h_{1bc4}$ | $h_{d91f}$ | $h_{6763}$ | $h_{1df3}$ | $h_{9335}$ | $h_{84df}$ |
| $h_{a9f9}$ | $h_{a9f9}$ | $h_{6b21}$ | $h_{fab1}$ | $h_{fcdc}$ | $h_{ecb0}$ | $h_{93e0}$ | $h_{84df}$ |
| $h_{a9f9}$ | $h_{a9f9}$ | $h_{c18a}$ | $h_{d53f}$ | $h_{cf56}$ | $h_{0dda}$ | $h_{1bac}$ | $h_{84df}$ |
| $h_{a9f9}$ | $h_{a9f9}$ | $h_{741c}$ | $h_{26cb}$ | $h_{c8e6}$ | $h_{84df}$ | $h_{84df}$ | $h_{84df}$ |
| $h_{a9f9}$ | $h_{a9f9}$ | $h_{d584}$ | $h_{26cb}$ | $h_{c8e6}$ | $h_{84df}$ | $h_{84df}$ | $h_{84df}$ |

4 *N*x*N* current
blocks of 2*N*x2*N*
current block 1010

$h_{5600}$ | $h_{6104}$
$h_{9299}$ | $h_{9299}$ matching 2*N*x2*N*
candidate block
1020

$h_{5600}$ | $h_{6104}$
$h_{9299}$ | $h_{fab1}$ non-matching
2*N*x2*N* candidate
block 1030

$h_{5600}$ | $h_{9299}$
$h_{9299}$ | $h_{6104}$ non-matching
2*N*x2*N* candidate
block 1040

1. determine hash values for 4 NxN current blocks

2Nx2N current block 1110

| $h_{5600}$ | $h_{6104}$ |
|---|---|
| $h_{9299}$ | $h_{9299}$ |

---

2a. hash-based block matching for 1st NxN current block

2Nx2N current block 1110

| $\mathbf{h_{5600}}$ | $h_{6104}$ |
|---|---|
| $h_{9299}$ | $h_{9299}$ |

2b. update set of 2Nx2N blocks candidate for:

| $h_{5600}$ | ? |
|---|---|
| ? | ? | set 1120 of 2Nx2N candidate blocks block(624, 300), block(624, 301),
block(624, 302), block(624, 303),
block(624, 304), block(624, 305),
block(624, 306), block(624, 307),
block(624, 308), block(624, 309),
block(511, 814), block(511, 815), ...

---

3a. hash-based block matching for 2nd NxN current block

2Nx2N current block 1110

| $h_{5600}$ | $\mathbf{h_{6104}}$ |
|---|---|
| $h_{9299}$ | $h_{9299}$ |

2b. update set of 2Nx2N candidate blocks for:

| $h_{5600}$ | $h_{6104}$ |
|---|---|
| ? | ? | set 1120 of 2Nx2N candidate blocks block(624, 300), block(624, 301),
block(624, 302), block(624, 303),
block(624, 304), block(624, 305),
block(511, 814), block(511, 815),
block(511, 816), block(511, 817),
block(511, 818), block(993, 17), ...

FIG. 12

4b. update set of 2Nx2N candidate blocks for:

$h_{5600}$ | $h_{6104}$
$h_{9299}$ | ?

2Nx2N candidate blocks 1210

| $h_{5600}$ $h_{6104}$ / $h_{c540}$ $h_{8424}$ block(624, 300) | $h_{5600}$ $h_{6104}$ / $h_{c540}$ $h_{8424}$ block(624, 301) | $h_{5600}$ $h_{6104}$ / $h_{9299}$ $h_{7060}$ block(624, 302) | $h_{5600}$ $h_{6104}$ / $h_{9299}$ $h_{7060}$ block(624, 303) | $h_{5600}$ $h_{6104}$ / $h_{9299}$ $h_{7060}$ block(624, 304) |
| $h_{5600}$ $h_{6104}$ / $h_{9299}$ $h_{1211}$ block(624, 305) | $h_{5600}$ $h_{6104}$ / $h_{a368}$ $h_{75ac}$ block(511, 814) | $h_{5600}$ $h_{6104}$ / $h_{a368}$ $h_{75ac}$ block(511, 815) | $h_{5600}$ $h_{6104}$ / $h_{a368}$ $h_{df22}$ block(511, 816) | $h_{5600}$ $h_{6104}$ / $h_{a368}$ $h_{df22}$ block(511, 817) |
| | $h_{5600}$ $h_{6104}$ / $h_{9299}$ $h_{9299}$ block(993, 17) | $h_{5600}$ $h_{6104}$ / $h_{9299}$ $h_{9299}$ block(993, 18) | $h_{5600}$ $h_{6104}$ / $h_{9299}$ $h_{9299}$ block(993, 19) | $h_{5600}$ $h_{6104}$ / $h_{a368}$ $h_{df22}$ block(511, 818) |

1200

LOW-COST HASH TABLE CONSTRUCTION AND HASH-BASED BLOCK MATCHING FOR VARIABLE-SIZE BLOCKS

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last three decades, various video codec standards have been adopted, including the ITU-T H.261, H.262, H.263, H.264, and H.265 standards, the MPEG-1 and MPEG-4 Visual standards, the SMPTE 421M (VC-1) standard, and the AV1 standard. More recently, the ITU-T H.266 standard has been under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

A video encoder and decoder support various coding/decoding tools and modes. Motion compensation is a type of prediction used in most video encoders and decoders. For motion compensation, the sample values of a current block in a current picture are predicted using previously-reconstructed sample values in another picture, which is called a reference picture. A motion vector ("MV") indicates a displacement, from the position in the reference picture that is collocated with the current block, to the position of a region in the reference picture that includes the previously-reconstructed sample values used for prediction. The MV is signaled in the bitstream. Motion compensation is a form of inter-picture prediction. Motion estimation is the process of finding MVs during video encoding.

Intra block copy ("BC") is another prediction mode, which is supported in some newer video encoders and decoders. For intra BC prediction, the sample values of a current block in a current picture are predicted using previously-reconstructed sample values in the current picture. A block vector ("BV") indicates a displacement from the position of the current block to the position of a region in the current picture that includes the previously-reconstructed sample values used for prediction. The BV is signaled in the bitstream. Intra BC prediction is a form of intra-picture prediction—intra BC prediction for a block in a current picture does not use any sample values other than sample values in the current picture. BV estimation is the process of finding BVs during video encoding.

Motion estimation and BV estimation can be time-consuming, computationally-intensive processes. Many previous approaches to finding MVs and BVs during encoding are too slow for real-time encoding scenarios. Other approaches to finding MVs and BVs are faster but consume too much memory during encoding, especially when blocks are allowed to have variable size during encoding/decoding. As currently implemented, encoder-side decisions to find MVs and BVs during encoding are not made effectively for some scenarios.

SUMMARY

In summary, the detailed description presents innovations in hash table construction and hash-based block matching for image encoding or video encoding. The innovations can be used as part of motion estimation and/or block vector ("BV") estimation. In particular, the innovations can be used in real-time encoding scenarios when encoding screen capture content for a screen sharing application, desktop conferencing application, or other application. In some example implementations that allow blocks with variable size, the innovations can significantly reduce the computational cost and memory cost of hash table construction, while still providing encoder-side decisions that are fast and effective.

According to one aspect of the innovations described herein, an image encoder or video encoder determines hash values for respective base-size candidate blocks in a reference picture. Each of the base-size candidate blocks in the reference picture has a base block size. The encoder stores, in a hash table, the hash values for the base-size candidate blocks in the reference picture. The encoder encodes a trial-size current block in a current picture. In some cases, the trial-size current block has a trial block size larger than the base block size. As part of the encoding the trial-size current block, the encoder uses hash-based block matching, between base-size current blocks of the trial-size current block and the base-size candidate blocks in the reference picture, to identify a trial-size matching block, if any, in the reference picture.

When variable-size blocks are allowed during encoding/decoding, the encoder selects a block size from multiple available block sizes. Instead of storing hash values for candidate blocks in a reference picture for each of the available block sizes, the encoder stores hash values only for the base-size candidate blocks in the reference picture. Compared to approaches that store hash values for all available block sizes, this can significantly reduce the computational cost and memory cost for hash table construction during encoding, without hurting compression efficiency or the overall speed of encoding with hash-based block matching.

The encoding the trial-size current block can use intra block copy prediction. In this case, the reference picture is the current picture. Or, the encoding the trial-size current block can use motion compensation. In this case, the reference picture is a previous picture different than the current picture.

In some example implementations, hash-based block matching for a trial-size current block can include iterations for the respective base-size current blocks of the trial-size current block. In an iteration of hash value evaluation, the encoder gets a hash value for a given one of the base-size current blocks of the trial-size current block. Based at least in part on the hash value for the given base-size current block, the encoder gets a set of base-size candidate blocks in the reference picture that match the given base-size current block. Then, based at least in part on the set of base-size candidate blocks, the encoder updates a set of trial-size candidate blocks in the reference picture. For example, in later iterations of the hash value evaluation, the encoder can update the set of trial-size candidate blocks by pruning any of the trial-size candidate blocks that can no longer match the trial-size current block. After the iterations for the base-size current blocks of the trial-size current block, the encoder can identify a trial-size matching block in the reference picture, from among any remaining trial-size candidate blocks, based at least in part on the quality of hash match with the trial-size current block.

The innovations for hash table construction and hash-based block matching can be implemented as part of a method, as part of a computer system configured to perform the method, or as part of a tangible computer-readable media storing computer-executable instructions for causing one or more processors, when programmed thereby, to perform the method. The various innovations can be used in combination or separately. The innovations described herein include, but are not limited to, the innovations covered by the claims and table of features at the end of the application. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 5 is a diagram illustrating aspects of block matching during video encoding.

FIG. 6 is a listing for an example hash table used in hash-based block matching.

FIG. 7 is a diagram illustrating an approach to determining hash values for different sizes of candidate blocks for hash-based block matching.

FIG. 8 is a listing for hash tables used in hash-based block matching for different sizes of candidate blocks.

FIG. 9 is a diagram illustrating examples of different sizes for a trial-size current block, together with N×N current blocks of the trial-size current block for hash-based block matching.

FIG. 10 is a diagram illustrating matching criteria for a 2N×2N current block during hash-based block matching with N×N current blocks.

FIGS. 11a and 11b are diagrams illustrating an example of encoding a 2N×2N current block using hash-based block matching with four N×N current blocks of the 2N×2N current block.

FIG. 12 is a diagram illustrating an example of updating a set of 2N×2N candidate blocks in a reference picture, as part of encoding the 2N×2N current block of FIGS. 11a and 11b.

DETAILED DESCRIPTION

The detailed description presents innovations in the areas of hash table construction and hash-based block matching for image encoding or video encoding. In particular, the innovations can be used for motion estimation and/or BV estimation in real-time encoding scenarios when encoding screen capture content for a screen sharing application, desktop conferencing application, or other application. In some example implementations in which encoders and decoders can use blocks with variable size, the innovations can significantly reduce the computational cost and memory cost of hash table construction, while still providing encoder-side decisions that are fast and effective.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems.

Figure 1:
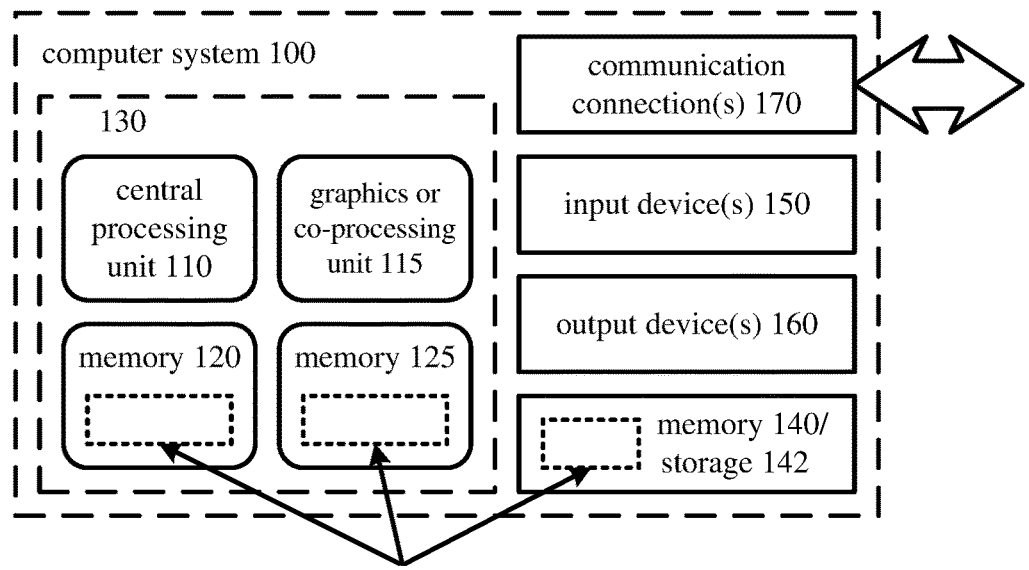
FIG. 1 is a diagram illustrating an example computer system in which some described embodiments can be implemented.

FIG. 1 illustrates a generalized example of a suitable computer system (100) in which several of the described innovations may be implemented. The innovations described herein relate to hash table construction and hash-based block matching during encoding. Aside from its use in hash table construction and hash-based block matching during encoding, the computer system (100) is not intended to suggest any limitation as to scope of use or functionality, as the innovations may be implemented in diverse computer systems, including special-purpose computer systems adapted for operations in hash table construction and hash-based block matching during encoding.

With reference to FIG. 1, the computer system (100) includes one or more processing cores of a central processing unit ("CPU") (110) and local, on-chip memory (120). The processing core(s) of the CPU (110) execute computer-executable instructions. The local memory (120) may be volatile memory (e.g., registers, cache, RAM), non-volatile memory (e.g., ROM, EEPROM, flash memory, etc.), or some combination of the two, accessible by the respective processing core(s). For software-based implementations of hash table construction and hash-based block matching, the local memory (120) can store software (180), in the form of computer-executable instructions for operations performed by the respective processing core(s), implementing tools for one or more innovations for low-cost hash table construction and hash-based block matching for variable-size blocks during image or video encoding. Alternatively, for GPU-accelerated implementations or hardware-accelerated implementations of hash table construction and hash-based block matching, the local memory (120) can store software (180), in the form of computer-executable instructions for operations performed by the respective processing core(s) for one or more drivers or other software layers, to implement tools for one or more innovations for low-cost hash table construction and hash-based block matching for variable-size blocks during image or video encoding.

The computer system (100) further includes one or more processing cores of a graphics processing unit ("GPU") (115) and local, on-chip memory (125). The processing cores of the GPU (115) execute computer-executable instructions (e.g., for shader routines for encoding operations). The local memory (125) may be volatile memory (e.g., registers, cache, RAM), non-volatile memory (e.g., ROM, EEPROM, flash memory, etc.), or some combination of the two, accessible by the respective processing core(s). For GPU-accelerated implementations, the local memory (125) can store software, in the form of computer-executable instructions for operations performed by the respective processing core(s), implementing tools for one or more innovations for low-cost hash table construction and hash-based block matching for variable-size blocks during image or video encoding.

The computer system (100) can also include one or more modules of special-purpose codec hardware (e.g., an application-specific integrated circuit ("ASIC") or other integrated circuit) along with local, on-chip memory. The local memory may be volatile memory (e.g., registers, cache, RAM), non-volatile memory (e.g., ROM, EEPROM, flash memory, etc.), or some combination of the two, accessible by the respective module(s).

More generally, the term "processor" may refer generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

With reference to FIG. 1, the computer system (100) includes memory (140) and storage (142). The memory (140) may be volatile memory (e.g., RAM), non-volatile memory (e.g., ROM, EEPROM, flash memory, etc.), or some combination thereof. The storage (142) may be non-volatile storage (e.g., magnetic media, optical media), or any other medium, accessible by the processing core(s). The storage (142) may be removable or non-removable. The memory (140) and/or storage (142) store software (180) implementing tools for one or more innovations for low-cost hash table construction and hash-based block matching for variable-size blocks during image or video encoding.

The computer system (100) includes one or more communication connections (170). For example, the computer system (100) includes one or more network adapters. As used herein, the term network adapter indicates any network interface card ("NIC"), network interface, network interface controller, or network interface device. The network adapter(s) enable communication over a network to another computing entity (e.g., server, other computer system). The network can be a telephone network, wide area network, local area network, storage area network, or other network. The network adapter(s) can support wired connections and/or wireless connections, for a wide-area network, local-area network, personal-area network, or other network. The network adapter(s) convey information such as computer-executable instructions, encoded image or video content, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) includes one or more input devices (150). For example, a video source provides video input. The video source can be a camera input that accepts video input in analog or digital form from a video camera, which captures natural video. Or, the video source can be a screen capture module (e.g., a driver of an operating system, or software that interfaces with an operating system) that provides screen capture content as input. Or, the video source can be a graphics engine that provides texture data for graphics in a computer-represented environment. Or, the video source can be a media player that plays a DVD, Blu-ray disk, other disk media and/or other format of media. Or, the video source can be a video card, TV tuner card, or other video input that accepts input video in analog or digital form (e.g., from a cable input, HDMI input or other input). As another example, an audio input accepts audio input in analog or digital form from a microphone, which captures audio, or other audio source.

The input device(s) (150) can further include a touch input device such as a keyboard, mouse, pen, or trackball, a scanning device, or another device that provides input to the computer system (100). The computer system (100) optionally includes a motion sensor/tracker input for a motion sensor/tracker, which can track the movements of a user and objects around the user. A game controller input can accepts control signals from one or more game controllers, over a wired connection or wireless connection.

The computer system (100) includes one or more output devices (160). For example, a video output provides video to a display device. The video output can be an HDMI output or other type of output. An audio output provides audio to one or more speakers. The output device(s) (160) can further include a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hardwired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures.

As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

Many of the techniques and tools described herein are illustrated with reference to a video encoder system. Alternatively, the techniques and tools described herein can be implemented in an image encoder system or other media encoder system.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Network Environments.

Figure 2A:
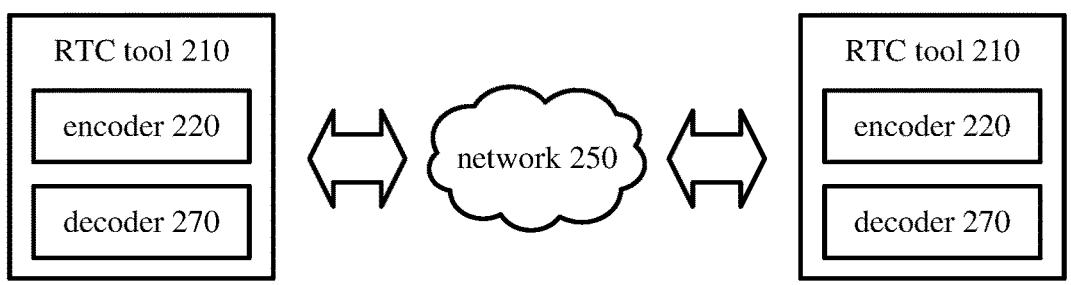
FIGS. 2a and 2b are diagrams illustrating example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet and/or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, the AV1 standard, another standard, or a proprietary format, with a corresponding decoder (270) accepting encoded data from the encoder (220). The bidirectional communication can be part of a video conference, conference call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
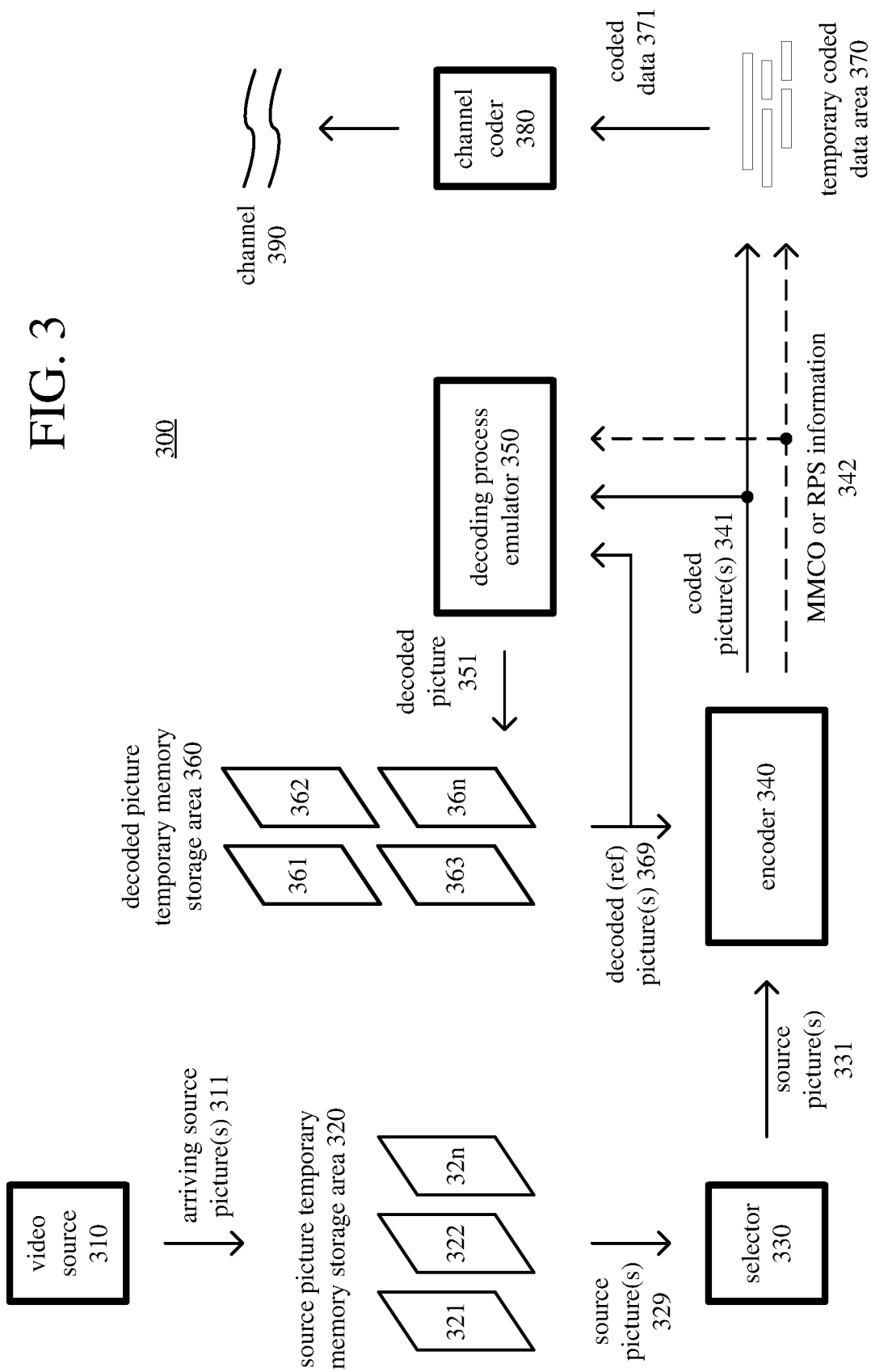
FIG. 3 is a diagram illustrating an example video encoder system in conjunction with which some described embodiments can be implemented.

A real-time communication tool (210) is configured to manage encoding by an encoder (220). FIG. 3 shows an example video encoder system (300) that can be included in the real-time communication tool (210). Alternatively, the real-time communication tool (210) uses another encoder system. A real-time communication tool (210) is also configured to manage decoding by a decoder (270).

In the network environment (202) shown in FIG. 2b, an encoding tool (212) includes an encoder (220) that is configured to encode media for delivery to multiple playback tools (214), which include decoders (270). The unidirectional communication can be provided for a video surveillance system, web monitoring system, remote desktop conferencing presentation, gameplay broadcast, or other scenario in which media is encoded and sent from one location to one or more other locations for playback. Although the network environment (202) in FIG. 2b includes two playback tools (214), the network environment (202) can include more or fewer playback tools (214). In general, a playback tool (214) is configured to communicate with the encoding tool (212) to determine a stream of encoded media for the playback tool (214) to receive. The playback tool (214) is configured to receive the stream, buffer the received encoded data for an appropriate period, and begin decoding and playback.

FIG. 3 shows an example video encoder system (300) that can be included in the encoding tool (212). Alternatively, the encoding tool (212) uses another encoder system. The encoding tool (212) can also include server-side controller logic for managing connections with one or more playback tools (214). A playback tool (214) can also include client-side controller logic for managing connections with the encoding tool (212).

III. Example Video Encoder Systems.

FIG. 3 is a block diagram of an example video encoder system (300) in conjunction with which some described embodiments may be implemented. The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding a particular type of content (e.g., screen capture content). The video encoder system (300) can be implemented as an operating system module, as part of an application library, or as a standalone application. Overall, the video encoder system (300) receives a sequence of source video pictures (311) from a video source (310) and produces encoded data as output to a channel (390). The encoded data output to the channel can include content encoded using low-cost hash table construction and hash-based block matching.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded, or reconstructed image data. For progressive-scan video, a picture is a progressive-scan video frame. For interlaced video, an interlaced video frame can be de-interlaced prior to encoding. Alternatively, two complementary interlaced video fields can be encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the video encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format), in which the color components are organized as primary and secondary components. Screen capture content is often encoded in a format (e.g., YUV 4:4:4 or RGB 4:4:4) with high chroma sampling resolution, although it may also be encoded in a format with lower chroma sampling resolution (e.g., YUV 4:2:0).

Figure 4A:
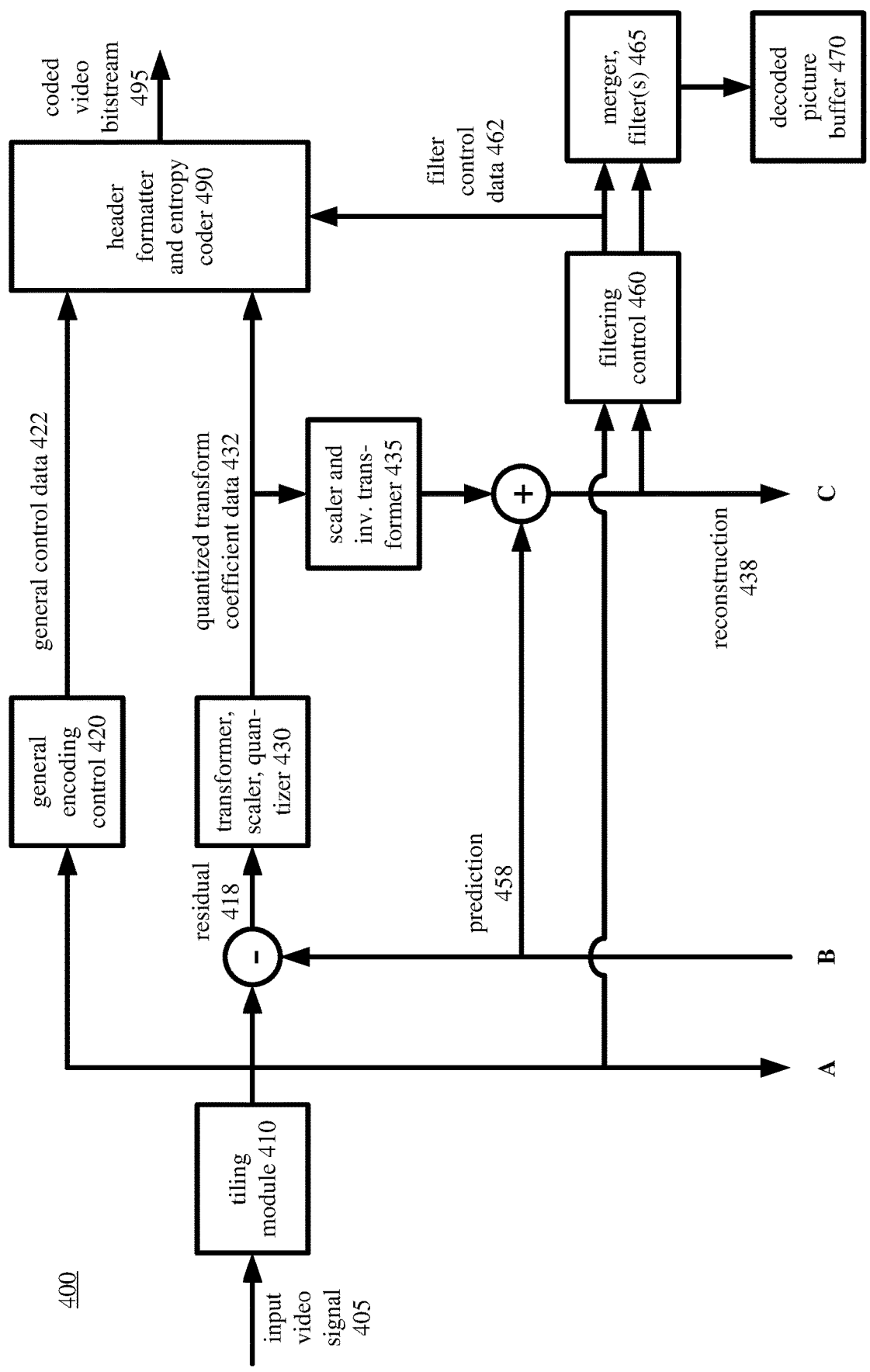
FIGS. 4a and 4b are diagrams illustrating an example video encoder in conjunction with which some described embodiments can be implemented.
Figure 4B:
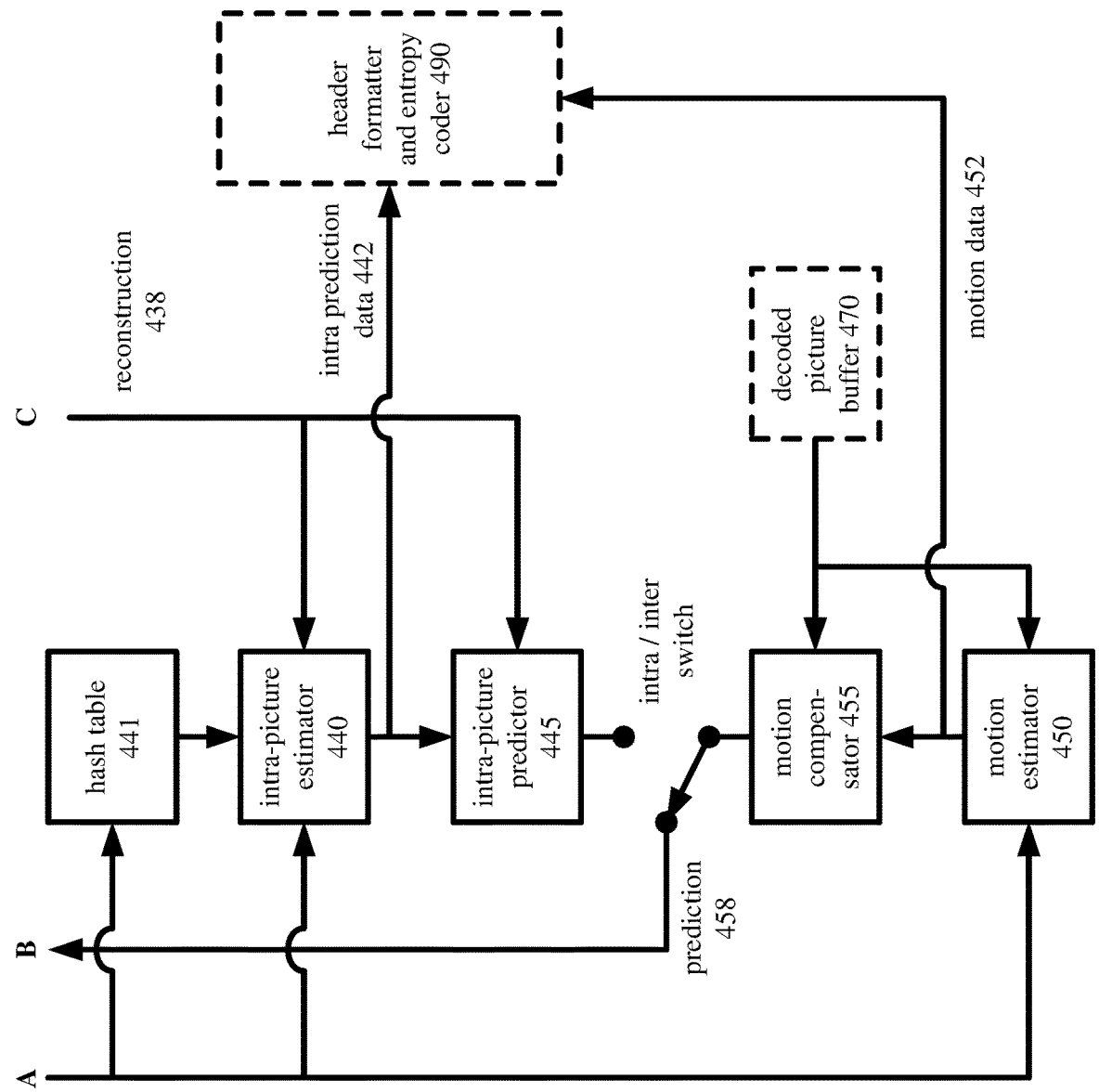

The encoder (340) encodes the selected picture (331) to produce a coded picture (341). FIGS. 4a and 4b are block diagrams of a generalized video encoder (400) in conjunction with which some described embodiments may be implemented. The encoder (400) receives the selected, current picture (331) from a sequence of video pictures as an input video signal (405) and produces encoded data for the coded picture (341) in a coded video bitstream (495) as output. The codec format of the coded video bitstream (495) can be H.265/HEVC format, AV1 format, or another codec format, or a variation or extension thereof.

The encoder (400) compresses pictures using intra-picture coding and inter-picture coding. Many of the components of the encoder (400) are used for both intra-picture coding and inter-picture coding. The exact operations performed by those components can vary depending on the codec format and the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. In implementations for the AV1 format, the encoder (400) can also partition a picture into segments, and parameters of blocks (or superblocks) of a given segment can be collectively signaled for the given segment, which can improve compression efficiency. In implementations for the H.265/HEVC format, the encoder (400) partitions a picture into one or more slices, where each slice includes one or more slice segments. Thus, a slice can be an entire picture or a section of the picture. A slice can be decoded independently of other slices in a picture, which improves error resilience.

The content of a picture (or tile, slice, etc.) is further partitioned into blocks of sample values for purposes of encoding and decoding. The encoder (400) is block-based and uses a block format that depends on implementation. Blocks may be further sub-divided at different stages, e.g., at the prediction, frequency transform and/or entropy encoding stages. For example, a picture can be divided into 256×256 blocks, 128×128 blocks, 64×64 blocks, 32×32 blocks, or 16×16 blocks, which can in turn be divided into smaller blocks of sample values at different stages of coding and decoding.

In implementations of encoding for the AV1 format, for example, the encoder (400) partitions a picture (or tile) into superblocks. A superblock ("SB") includes luma sample values organized as a luma block and corresponding chroma sample values organized as chroma blocks. A root SB with size 128×128 can be recursively partitioned into smaller square SBs of size 64×64, 32×32, 16×16, or 8×8. A given square 2N×2N SB can also be partitioned into two rectangular N×2N or 2N×N SBs, in which case the smaller N×2N or 2N×N SBs are not further partitioned. Thus, the size of an SB can be 128×128, 128×64, 64×128, 64×64, 64×32, 32×64, 32×32, 32×16, 16×32, 16×16, 16×8, 8×16, or 8×8. Further, an 8×8 SB can be split into two 8×4 SBs, two 4×8 SBs, or four 4×4 SBs for some operations.

Generally, prediction operations are performed for an SB as a prediction unit. An SB may be split into smaller blocks for transform operations, or multiple SBs may be combined for a transform that covers multiple prediction units (SBs). Parameters such as prediction mode (inter or intra), MV data, reference frame data, interpolation filter type, transform size and type, skip status, and segment index are typically specified for an SB. For a small SB (e.g., 8×4 SB, 4×8 SB, or 4×4 SB), however, some parameters (such as prediction mode and MV data) can be signaled for the small SB while other parameters are signaled for the 8×8 SB that includes the small SB.

In implementations of encoding for the H.265/HEVC standard, for example, the encoder (400) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. A CTU can be split into four CUs, with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into smaller PUs (e.g., four 4×4 PUs, two 4×8 PUs, or two 8×4 PUs, if the smallest CU size is 8×8, for intra-picture prediction) or the PU can have the smallest CU size, as indicated by a syntax element for the CU. Alternatively, a larger CU can be split into multiple PUs. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

As used herein, the term "block" can indicate an m×n arrangement of sample values, a residual data unit, a CTB, a CB, a PB, a TB, or some other set of sample values, depending on context. A block can be square or rectangular, or even a single column or row of sample values. Alternatively, a block can have some other shape (e.g., triangle, hexagon, arbitrary shape, or an area of a coded video object with a non-rectangular shape). Blocks can have sizes that vary within a picture. Prediction and transform operations can be performed on a block-by-block basis. The term "unit" can indicate an SB, a macroblock, a CTU, a CU, a PU, a TU, or some other set of blocks, or it can indicate a single block, depending on context. Units can have sizes that vary within a picture. A luma block is an example of a primary component block for a YUV color space. The label "luma block" is sometimes used, however, to indicate a primary component block even for another color space such as an RGB color space, BGR color space, or GBR color space. Similarly, a chroma block is an example of a secondary component block for a YUV color space. The label "chroma block" is sometimes used, however, to indicate a secondary component block even for another color space such as an RGB color space, BGR color space, or GBR color space.

With reference to FIG. 4a, the general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), intra-picture predictor (445), motion estimator (450), motion compensator (455) and intra/inter switch) to set and change coding parameters during encoding. In particular, the general encoding control (420) can decide whether and how to use hash table construction and hash-based block matching for intra BC prediction and/or motion compensation during encoding. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to candidate blocks in one or more reference pictures. For example, the motion estimator (450) estimates the motion of a current block in the current picture relative to one or more reference pictures. The motion estimator (450) can construct a hash table (not shown) and perform hash-based block matching, as described herein, to find MVs. The hash table, which can be implemented using any of various data structures, organizes candidate blocks for hash-based block matching and hence provides a block hash dictionary. When a reference picture is identified, the hash table can be created or updated to store information about candidate blocks in the reference picture. Hash values for candidate blocks are determined using input sample values of the candidate blocks. Alternatively, hash values for candidate blocks can be determined using reconstructed sample values of the candidate blocks. When a reference picture is removed, the hash table can be updated to remove information about candidate blocks in the reference picture. For motion estimation and compensation, a reference block is a block of sample values in a reference picture that is used to generate prediction values for the current block of sample values of the current picture. The decoded picture buffer (470) buffers one or more reconstructed previously coded pictures for use as reference pictures. When multiple reference pictures are used, the multiple reference pictures can be from different temporal directions or the same temporal direction. The motion estimator (450) produces as side information motion data (452) such as MV data, merge mode index values or other MV selection data, and reference picture selection data. The motion data (452) is provided to the header formatter/entropy coder (490) as well as the motion compensator (455).

The motion compensator (455) applies MVs to the reconstructed reference picture(s) from the decoded picture buffer (470). The motion compensator (455) produces motion-compensated predictions for blocks in the current picture.

In a separate path within the encoder (400), an intra-picture estimator (440) determines how to perform intra-picture prediction for blocks of sample values of a current picture of the input video signal (405) using other, previously-reconstructed sample values in the current picture. The current picture can be entirely or partially coded using intra-picture coding. Using sample values of a reconstruction (438) of the current picture, for intra spatial prediction (extrapolation), the intra-picture estimator (440) determines how to spatially predict sample values of a current block in the current picture from neighboring, previously-reconstructed sample values of the current picture.

Or, for intra BC prediction, the intra-picture estimator (440) estimates displacement from a current block in the current picture to a position of a candidate block in previously-reconstructed sample values of the current picture. For intra BC prediction, a reference block of sample values in the current picture is used to generate prediction values for the current block. For example, for intra BC prediction, the intra-picture estimator (440) estimates displacement from a current block to a reference block, which can be indicated with a BV value. To determine BV values for intra BC prediction, the intra-picture estimator (440) can construct a hash table (441) and perform hash-based block matching, as described herein, to find the BV values. The hash table (441), which can be implemented using any of various data structures, organizes candidate blocks for hash-based block matching and hence provides a block hash dictionary. Hash values for candidate blocks are determined using input sample values of the candidate blocks and stored in the hash table (441). Alternatively, hash values for candidate blocks can be determined using reconstructed sample values of the candidate blocks. In this case, the hash table can be updated during encoding to store information about new candidate blocks, as those candidate blocks become available for use in hash-based block matching.

Depending on implementation, the intra-picture estimator (440) can perform BV estimation for the current block using reconstructed sample values before in-loop filtering, using reconstructed sample values after in-loop filtering, or using input sample values. In general, by using unfiltered, reconstructed sample values (or input sample values) for BV estimation, the intra-picture estimator (440) can avoid a sequential-processing bottleneck (which may result from filtering reconstructed sample values before BV estimation/intra BC prediction).

The intra-picture estimator (440) produces as side information intra prediction data (442), such as information indicating whether intra prediction uses spatial prediction or intra BC prediction, prediction mode direction (for intra spatial prediction), and BV values (for intra BC prediction). The intra prediction data (442) is provided to the header formatter/entropy coder (490) as well as the intra-picture predictor (445).

According to the intra prediction data (442), the intra-picture predictor (445) spatially predicts sample values of a current block in the current picture from neighboring, previously-reconstructed sample values of the current picture. Or, for intra BC prediction, the intra-picture predictor (445) predicts the sample values of a current block using previously-reconstructed sample values of a reference block, which is indicated by a displacement (BV value) for the current block.

In some example implementations, hash values for candidate blocks used in hash-based block matching are determined from input sample values. That is, the hash values are computed using an input version of a picture that is later used as a reference picture. During hash-based block matching, the encoder determines the hash value for a current block using input sample values. The encoder compares it (or otherwise uses the hash value) against the hash values determined from input sample values for candidate blocks. Even so, reconstructed sample values of a matching block in the reference picture are used to represent the current block. Thus, motion compensation or intra BC prediction operations still use reconstructed sample values.

Using hash values determined from input sample values can improve prediction performance when some blocks are lossy coded. In this case, due to quantization noise, the encoder may be unable to find a matching block that exactly matches the current block if hash values are determined from reconstructed sample values. By determining hash values from input sample values, hash-based block matching is not affected by distortion introduced by lossy coding. The encoder still signals to a decoder which matching block to use for a current block (e.g., using a MV or BV value). Using this information and reconstructed sample values, the decoder reconstructs the current block using a block copy operation.

Alternatively, hash values for candidate blocks can be determined from reconstructed sample values. During hash-based block matching, the encoder determines the hash value for a current block using input sample values. The encoder compares it (or otherwise uses the hash value) against the hash values determined from reconstructed sample values for candidate blocks.

In some example implementations, intra BC prediction is a special case of motion compensation for which the reference picture is the current picture. In such implementations, functionality described above with reference to the intra-picture estimator (440) and intra-picture predictor (445) for BV estimation and intra BC prediction can be implemented in the motion estimator (450) and motion compensator (455), respectively. The motion estimator (450) can construct a hash table and perform hash-based block matching as described herein.

For motion compensation and intra BC prediction, an encoder typically finds a single MV or BV value for a prediction unit, and that single MV or BV value (or a scaled version thereof) is used for the blocks of the prediction unit. When the chroma data for a picture has the same resolution as the luma data (e.g. when the format is YUV 4:4:4 format or RGB 4:4:4 format), the MV or BV value that is applied for the chroma block may be the same as the MV or BV value applied for the luma block. On the other hand, when the chroma data for a picture has reduced resolution relative to the luma data (e.g. when the format is YUV 4:2:0 format), the MV or BV value that is applied for the chroma block may be scaled down and possibly rounded to adjust for the difference in chroma resolution (e.g. by dividing the vertical and horizontal components of the BV value by two and truncating or rounding them to integer values).

For a palette coding mode, the encoder (400) represents at least some of the sample values of a unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel, where a pixel is a set of co-located sample values. For encoding of the unit, appropriate index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (458) for a given block will be a motion-compensated prediction or intra-picture prediction.

In some example implementations, no residual is calculated for a unit encoded in palette coding mode. Instead, residual coding is skipped, and the predicted sample values are used as the reconstructed sample values. Residual coding can selectively be skipped for other blocks.

When residual coding is not skipped, the difference (if any) between a block of the prediction (458) and a corresponding part of the original current picture of the input video signal (405) provides values of the residual (418). During reconstruction of the current picture, when residual values have been encoded/signaled, reconstructed residual values are combined with the prediction (458) to produce an approximate or exact reconstruction (438) of the original content from the video signal (405). (In lossy compression, some information is lost from the video signal (405).)

As part of residual coding, in the transformer/scaler/quantizer (430), when a frequency transform is not skipped, a frequency transformer converts spatial-domain video information into frequency-domain (i.e., spectral, transform)

data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. The scaler/quantizer scales and quantizes the transform coefficients. The encoder (400) can set values for quantization parameter ("QP") for a picture, tile, slice and/or other portion of video, and quantize transform coefficients accordingly. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

To reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (400) combines reconstructed residual values with values of the prediction (458) (e.g., motion-compensated prediction values, intra-picture prediction values) to form the reconstruction (438). When residual values have not been encoded/signaled, the encoder (400) uses the values of the prediction (458) as the reconstruction (438).

For intra-picture prediction, the values of the reconstruction (438) can be fed back to the intra-picture estimator (440) and intra-picture predictor (445). The values of the reconstruction (438) can be used for motion-compensated prediction of subsequent pictures.

The values of the reconstruction (438) can be further filtered. A filtering control (460) determines how to perform adaptive deblock filtering, sample adaptive offset ("SAO") filtering, and/or other filtering on values of the reconstruction (438), for a given picture of the video signal (405), within the motion compensation loop (that is, "in-loop" filtering). The filtering control (460) produces filter control data (462), which is provided to the header formatter/entropy coder (490) and merger/filter(s) (465).

In the merger/filter(s) (465), the encoder (400) merges content from different units (and tiles) into a reconstructed version of the picture. The encoder (400) selectively performs deblock filtering, SAO filtering, and/or other filtering (such as constrained directional enhancement filtering or loop restoration filtering) according to the filter control data (462) and rules for filter adaptation, so as to adaptively smooth discontinuities across boundaries in the pictures. Filtering such as de-ringing filtering or adaptive loop filtering (not shown) can alternatively or additionally be applied. Tile boundaries can be selectively filtered or not filtered at all, depending on settings of the encoder (400), and the encoder (400) may provide syntax elements within the coded bitstream to indicate whether or not such filtering was applied. The decoded picture buffer (470) buffers the reconstructed current picture for use in subsequent motion-compensated prediction.

The header formatter/entropy coder (490) formats and/or entropy codes the general control data (422) (e.g., mode decisions), quantized transform coefficient data (432), intra prediction data (442) (e.g., BV values), motion data (452), and filter control data (462). For the motion data (452), the header formatter/entropy coder (490) can select and entropy code merge mode index values, or a default MV predictor can be used. In some cases, the header formatter/entropy coder (490) also determines MV differentials for MV values (relative to MV predictors for the MV values), then entropy codes the MV differentials. For the intra prediction data (442), a BV value can be encoded using prediction. The prediction can use a default predictor (e.g., a BV value from a neighboring unit, or median of BV values from multiple neighboring units). When multiple predictors are possible, a predictor index can indicate which of the multiple predictors to use for prediction of the BV value. The header formatter/entropy coder (490) can select and entropy code predictor index values (for intra BC prediction), or a default predictor can be used. In some cases, the header formatter/entropy coder (490) also determines differentials (relative to predictors for the BV values), then entropy codes the BV differentials. For palette coding mode, the header formatter/entropy coder (490) can encode palette data.

The header formatter/entropy coder (490) can perform entropy coding in various ways. Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The header formatter/entropy coder (490) can use different coding techniques for different kinds of data, can apply multiple techniques in combination (e.g., by applying Golomb-Rice coding followed by CABAC), and can choose from among multiple code tables or contexts within a particular coding technique.

The header formatter/entropy coder (490) provides the encoded data in the coded video bitstream (495). The codec format of the coded video bitstream (495) can be H.265/HEVC format, AV1 format, or another codec format, or a variation or extension thereof.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

With reference to FIG. 3, in addition to producing encoded data for a coded picture (341), the encoder (340)

produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360), which is an example of decoded picture buffer (470). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

The coded pictures (341) and MMCO/RPS information (342) (or information equivalent to the MMCO/RPS information (342), since the dependencies and ordering structures for pictures are already known at the encoder (340)) are processed by a decoding process emulator (350) in the encoder system (300) of FIG. 3. The decoding process emulator (350) implements some of the functionality of a decoder, for example, decoding tasks to reconstruct sample values of the current picture and reference pictures. (In practice, the decoding process emulator (350) is implemented as part of the encoder (340). For example, the decoding process emulator (350) includes the scaler and inverse transformer (435), the merger/filters (465) and other functionality to reconstruct sample values.) In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures represented with syntax elements for various layers of bitstream syntax. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format), in which case the channel encoder (380) can add syntax elements as part of the syntax of the media transmission stream. Or, the channel encoder (380) can organize the aggregated data for storage as a file (e.g., according to a media container format), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Examples of Hash Table Construction and Hash-Based Block Matching.

This section presents various features of hash table construction and hash-based block matching. Hash-based block matching can improve encoding performance when encoding certain "artificially" created video content such as screen capture content. Common scenarios for encoding/decoding of screen capture content include remote desktop conferencing and encoding/decoding of graphical overlays on natural video or other "mixed content" video.

In motion compensation and intra block copy ("BC") prediction, the sample values of a current block of a picture are predicted using sample values in a reference block. An MV or BV value indicates a displacement from the positon of the current block to the position of the reference block. The sample values used for prediction are previously-reconstructed sample values, which are thus available at the encoder during encoding and at the decoder during decoding. The MV or BV value is signaled in the bitstream, and a decoder can use the MV or BV value to determine the reference block to use for prediction, which is also reconstructed at the decoder.

The reference block indicated by the MV or BV value is sometimes termed the "matching block" for the current block. The matching block can be identical to the current block, or it can be an approximation of the current block. Suppose the top-left position of a current block is at position $(x_0, y_0)$ in the current picture, and suppose the top-left position of the reference block is at position $(x_1, y_1)$ in a reference picture. An MV or BV value indicates the displacement $(x_1-x_0, y_1-y_0)$. For example, if the top-left position of the current block is at position (256, 128), and the top-left position of the reference block is at position (226, 104), the MV or BV value is (−30, −24). In this example, a negative horizontal displacement indicates a position to the left of the current block, and a negative vertical displacement indicates a position above the current block.

In motion estimation or BV estimation, finding a matching block for a current block can be computationally complex and time consuming, considering the number of candidate blocks that the encoder may evaluate. Comparing the sample values of a current block to the sample values of a single candidate block in sample-wise block matching can involve thousands of operations. For example, comparing the sample values of a 64×64 current block and a 64×64 candidate block can involve 64×64=4096 comparison operations (e.g., subtraction operations) as well as operations to tally results of the comparison operations. In general, candidate blocks can be anywhere within the reconstructed content that can be used for prediction. A candidate block can overlap with other candidate blocks. The computational complexity of motion estimation and BV estimation is largely due to the high number of candidate blocks against which a current block is compared.

FIG. 5 illustrates the number of candidate blocks for block matching for a current block (530) of a current picture (510) having a width of 1920 sample values and a height of 1080 sample values. The current block (530) is a 4×4 block at position (896, 576) in the current picture (510), and the candidate blocks are also 4×4 blocks. The search area for the candidate blocks is shown with hatched lines in FIG. 5. Any 4×4 block within the search area can be considered a candidate block, with no overlap between a candidate block and current block. The number of candidate blocks within the current picture (510) is given by: (yposition$_{block}$−height$_{block}$+1)×(width$_{pic}$−width$_{block}$+1)+(xposition$_{block}$−width$_{block}$+1), where xposition$_{block}$ and yposition$_{block}$ indicate the position of the current block (530) in the picture (510), width$_{pic}$ is the width of the picture (510), and width$_{block}$ and height$_{block}$ are the dimensions of the current block (530). For the values shown in FIG. 5, there are roughly 1.1 million candidate blocks in the search area for the current block (530). Performing sample-wise block matching operations between the current block (530) and even a small set of the possible candidate blocks is computationally intensive.

If candidate blocks are available throughout an entire reference picture (for motion estimation), the number of operations can be even higher. If the search range includes multiple reference pictures (for motion estimation), the number of operations can be still higher. An encoder can use hash-based block matching to speed up the process of finding a matching block for a current block.

When an encoder uses hash-based block matching, the encoder determines a hash value for each of multiple candidate blocks in a reference picture. One or more hash tables store the hash values for the candidate blocks. When encoding a current block, the encoder determines a hash value for the current block using the same hash function, and then searches the hash table(s) for a matching hash value. If two blocks are identical, their hash values are the same. Using hash values, an encoder can quickly and efficiently identify candidate blocks that have the same hash value as the current block, and filter out candidate blocks that have different hash values. The encoder can then further evaluate those candidate blocks having the same hash value as the current block. (Different blocks can have the same hash value. Among the candidate blocks with the same hash value, the encoder can identify a candidate block that matches the current block.)

Overall, since hash value comparisons are much simpler than sample-wise block matching, hash-based block matching can make the process of evaluating the candidate blocks in a large search range much more efficient, even after accounting for the cost of hash table construction. Also, hash values for candidate blocks can be reused in hash-based block matching for different blocks within a picture during encoding. In some cases, the cost of computing hash values for candidate blocks can be amortized across hash-based block matching operations for the entire picture.

A. Examples of Hash Functions and Inputs to Hash Functions.

The hash function hash( ) used for hash-based block matching depends on implementation. The hash function hash( ) can be a cyclic redundancy check ("CRC") function. In some example implementations, the hash function is a 32-bit CRC function (CRC-32). CRC functions are fast and widely implemented, since they are commonly used for error checking purposes, and they may even be directly supported in special instructions in the instruction set for a processor. When used for hash-based block matching, CRC functions work well to find a matching block that is identical to a current block. Changing the sample values of a block slightly can lead to different CRC hash values. As such, a CRC function typically does not help find a matching block that only approximates a current block. Alternatively, the hash function hash( ) can be a cryptographic hash function (such as MD5 or SHA), a hash function that uses averaging and XOR operations (as described in U.S. patent Ser. No. 10/567,754), or a locality-sensitive hash function (as described in U.S. patent Ser. No. 10/567,754). Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value, which may be suitable when a matching block can approximate the current block.

In general, a hash function hash( ) yields I possible i-bit hash values, where i is a number such as 8, 12, 16, 24, or 32, and I=$2^i$. For an i-bit hash value, j bits can be used as a hash index, and k bits can be used as a check value, where $1 \leq j \leq i$, and j+k=i. The values of i, j, and k depend on implementation. For example, i is 32 bits, j is 16 bits, and k is 16 bits. Or, as another example, i is 16 bits, j is 12 bits, and k is 4 bits. Or, as another example, i is 16 bits, j is 16 bits, and k is 0 bits (no check value). The j bits used as a hash index can have one of J possible values, where J=$2^j$. The J possible hash index values are designated $h_0$ to $h_{J-1}$. For a given hash index, the candidate blocks with that hash index are grouped in a hash table. If a hash index has fewer bits, the hash table includes fewer categories, but each category tends to include more candidate blocks. If a hash index has more bits, the hash table includes more categories, and each category tends to include fewer candidate blocks.

In some example implementations, hash values are determined from input sample values for candidate blocks. That is, the sample values are part of an input version of a picture. During hash-based block matching, the encoder determines the hash value for a current block using input sample values. The encoder compares the hash value for the current block (or otherwise uses the hash value) against the hash values determined from input sample values for candidate blocks. Even so, reconstructed sample values from a matching block are used to represent the current block. Thus, prediction operations still use reconstructed sample values.

Alternatively, hash values are determined from reconstructed sample values for candidate blocks. That is, the sample values are part of previously encoded then reconstructed content in a picture. During hash-based block matching, the encoder determines the hash value for a current block using input sample values. The encoder compares the hash value for the current block (or otherwise uses the hash value) against the hash values determined from reconstructed sample values for candidate blocks.

B. Examples of Hash Tables and Data Structures to Implement Hash Tables.

An encoder uses a hash table that organizes candidate blocks according to their hash index values. FIG. 6 illustrates an example hash table (600). The hash table (600) organizes hash values for candidate blocks B(x, y), where x and y indicate horizontal and vertical coordinates, respectively, for the top-left position of a given candidate block. For a candidate block B(x, y) in a search range, the encoder determines a hash value hash(B) for the candidate block.

For the hash function hash( ) the J possible hash index values are $h_0$ to $h_{j-1}$. In the hash table (600), the candidate blocks are distributed into J groups. For example, if the hash function hash( ) produces 16-bit hash index values, the candidate blocks are split into $2^{16}$=65536 groups. Groups can include different numbers of candidate blocks. Candidate blocks with the same hash index are classified in the same candidate block list. A given candidate block list can include zero or more entries. For example, the candidate block list (610) for the hash index $h_0$ has more than five entries for candidate blocks, the list for the hash index $h_1$ has three entries, the list for the hash index $h_2$ has no entries, the list (613) for the hash index $h_3$ has four entries, and the list (619) for the hash index has more than five entries.

An $entry_x$ includes information for the $x^{th}$ candidate block with a given hash index. As shown in FIG. 6, an entry in a candidate block list can include the position of a given candidate block B(x, y) (e.g., horizontal and vertical coordinates for the top-left position of the candidate block). An entry in a candidate block list can also include a check value, which can be used to filter candidate blocks with the same hash index value. The check value can be remaining bits from a hash value, which are the part of a hash value not used as a hash index (e.g., a k-bit value, which is the part of an i-bit hash value not used as a j-bit hash index). Or, the check value can be a separately-determined hash value (e.g., a value determined using a different hash function). Alternatively, an $entry_x$ can include other and/or additional information for a candidate block.

A hash table can be implemented with any of various types of data structures. For example, a hash table can be implemented using a linked list or array of slots (also called buckets or hash table elements) associated with the respective hash index values. Each of the slots, in turn, has a list of candidate blocks with the hash index value associated with the slot. A list of candidate blocks can be implemented as a linked list or array of entries. Some programming languages directly support hash table functionality using built-in associative arrays or standard library modules.

When hash values for candidate blocks are determined from input sample values, the hash table grows as hash values are computed for blocks of input pictures to be used as reference pictures. When hash values for candidate blocks are determined from reconstructed sample values, the hash table grows during encoding, as more candidate blocks are added to the reconstructed content and hence made available for use in hash-based block matching. In particular, after a current block is encoded, new candidate blocks that overlap the just-encoded current block are available for use in hash-based block matching. For a high-resolution reference picture, the hash table can store information representing a very large number of candidate blocks.

C. Examples of Hash-Based Block Matching.

During hash-based block matching for a current block (for BV estimation or motion estimation), the encoder uses the hash function hash( ) to determine the hash value (and hash index) of the current block. Using the hash index of the current block, the encoder can identify candidate blocks that have the same hash index, and filter out the other candidate blocks.

In FIG. 6, the hash index for the current block is $h_3$. The encoder identifies candidate blocks that have the hash index $h_3$ (shown in outlined box in FIG. 6) and filters out the other candidate blocks. The encoder retains the candidate block list with the same hash index and rules out the other J−1 lists. Thus, by a simple lookup operation using the hash index, the encoder can eliminate (J−1)/J of the candidate blocks (on average), and focus on the remaining 1/J candidate blocks (on average) in the retained list.

The remaining 1/J candidate blocks (having the same hash index as the current block) can still include a large number of candidate blocks, which might or might not be identical to the current block. From the remaining 1/J candidate blocks, the encoder can identify a matching block for the current block in various ways.

For example, to identify a matching block among candidate blocks in the retained candidate block list, the encoder can compare the check value for the current block to the check values of the respective candidate blocks in the retained candidate block list. If the check value for the current block matches one of the check values of the candidate blocks in the retained candidate block list, that candidate block can still qualify a matching block. The check value for a block can be determined when the hash index for the block is determined (e.g., determining a k-bit check value and j-bit hash index from an i-bit hash value). Or, the check value for a block can be determined using a different hash function than the hash function used to determine the hash index for the block.

Or, as another example, to identify a matching block among candidate blocks in the retained candidate block list, the encoder can perform sample-wise block matching between the current block and the respective candidate blocks in the retained candidate block list.

When an encoder uses hash-based block matching during BV estimation, a hash table may include hash values for candidate blocks throughout a current picture, which are computed from the input sample values of the current picture. In this case, the hash value for a current block in the current picture may match the hash value for a candidate block in a later (not yet encoded) section of the current picture. A reference block must be part of the previously encoded and reconstructed section of the current picture, however, in order for the reference block to be available for intra BC prediction during decoding. Similarly, when an encoder uses hash-based block matching during motion estimation, some sections of a reference picture may be unavailable (e.g., if motion-constrained tile sets are used) to predict a current block in a current picture. In such scenarios, the encoder checks block availability during hash-based block matching. In some example implementations, the encoder can check whether a candidate block is available for use as a reference block for the current block based upon tile boundaries, slice boundaries, and/or coding order (also called decoding order) of blocks. For example, for BV estimation, the encoder can check that the candidate block is within the same tile and same slice as the current block, and check that the candidate block is earlier than the current block in coding order.

D. High-Cost Approaches to Handling Variable-Size Blocks in Hash Table Construction and Hash-Based Block Matching.

As explained in section III, in some implementations of video encoding, the blocks of a picture can have variable size for prediction operations. For example, for motion compensation or intra BC prediction, a block can have a size of 64×64, 32×32, 16×16, 8×8, 8×4, 4×8, or 4×4. For hash-based block matching, one or more hash tables can store hash values for respective available block sizes. The hash table(s) potentially store hash values for candidate blocks for all of the available block sizes, at all of the possible positions in reference pictures.

In one approach, a single hash table stores hash values for all of the available block sizes. One or more bits appended to a hash value or hash index, or made part of an entry for a candidate block, can indicate the block size of the candidate block. If there are four available block sizes, for example, two bits appended to a hash index (or included in an entry for a candidate block) can indicate the block size of the candidate block. If the bits for the block size and the bits for the hash index match between a current block and candidate block, the candidate block potentially matches the current block. To this end, a hash function can include block width and block height as inputs, or bits indicating block size can be added to a hash value.

In other approaches, multiple hash tables store hash values for different block sizes, respectively, among the available block sizes. In such approaches, the hash table used during hash-based block matching depends on the size of the current block. After a current block of any size is encoded, however, all hash tables can be updated, where new candidate blocks have been made available for hash-based block matching.

Whether a single hash table is used for all block sizes or different hash tables are used for different block sizes, constructing the hash table(s) can consume a significant amount of processor resources. Further, storing the hash values for candidate blocks with multiple block sizes in the hash table(s) can consume a significant amount of memory.

Generating hash values for candidate blocks for all of the available block sizes, at all of the possible positions in reference pictures, directly from sample values involves significant computation. The complexity of constructing hash table(s) for hash-based block matching can be reduced by retaining and reusing intermediate hash values. In particular, hash values can be determined using a hierarchical, bottom-up approach. FIG. 7 illustrates aspects of a hierarchical, bottom-up approach (700) to constructing hash table(s) for variable-size candidate blocks. The hash value (710) for an N×N candidate block is calculated from sample values of the N×N candidate block. Separately, hash values are calculated for neighboring N×N candidate blocks. For example, the N×N candidate blocks are 2×2 candidate blocks or 4×4 candidate blocks.

For a 2N×2N candidate block, instead of computing a hash value directly from the sample values of the 2N×2N candidate block, a hash value (720) is computed using the hash values of the four N×N candidate block that make up the 2N×2N candidate block. Similarly, for a 4N×4N candidate block, instead of computing a hash value directly from the sample values of the 4N×4N candidate block, a hash value (730) is computed using the hash values of the four 2N×2N candidate blocks that make up the 4N×4N candidate block. This process can continue through one or more additional stages, until hash values are computed for candidate blocks for all of the available block sizes. The hash values for the candidate blocks of different sizes are then stored in one or more hash tables. FIG. 8 shows a hash table (810) for N×N candidate blocks and a hash table (820) for 2N×2N candidate blocks. Hash tables for other sizes of candidate blocks are not shown. During hash-based block matching, a hash value is determined for a current block of a given block size among the multiple available block sizes, and the encoder searches for that hash value in the hash table that stores hash values for candidate blocks of the given block size.

Using a hierarchical, bottom-up approach to hash table construction can reduce computational complexity, but the computational cost of constructing the hash table(s) for candidate blocks of the different block sizes is still high. In particular, the computational cost may be prohibitive for real-time encoding applications. In addition, the memory cost of storing the hash table(s) for candidate blocks of the different block sizes is very high. For example, suppose the lower 16 bits of a 32-bit hash value for each candidate block provide a hash index, and the upper 16 bits of the 32-bit hash value provide a check value. For each of the available block sizes 4×4, 8×8, 16×16, 32×32, and 64×64, the encoder constructs a hash table with 65536 slots (since the hash index values have 16 bits, and $2^{16}$=65536). For each slot of the hash table, there is a list of candidate blocks that have the hash index value associated with the slot. Also suppose that each entry for a candidate block includes six bytes of information—two bytes for a horizontal coordinate of the position in a reference picture, two bytes for a vertical coordinate of the position in the reference picture, and two bytes for the 16-bit check value determined from the 32-bit hash value. The total amount of memory for one block size of candidate blocks in one reference picture is roughly w×h×6 bytes, where w and h are the width and the height of the reference picture. (Overhead for the 65536-slot index of the hash table is not counted, but some "phantom" candidate blocks extending past the right and bottom edges of the reference blocks are incorrectly counted.) For a reference picture having 1080p resolution, w×h is roughly 2 million. For one reference picture having spatial resolution of 1080p and five block sizes, the total memory cost for the five hash tables is roughly 60 million bytes. If multiple reference pictures are available, or if there are more available block sizes, the memory cost and computational cost for constructing the hash tables is even higher. Even if hash values for candidate blocks of different block sizes are stored in a single hash table, the memory cost and computational cost are comparable, considering the entries stored for the all of the candidate blocks of the different block sizes.

E. Low-Cost Approaches to Handling Variable-Size Blocks in Hash Table Construction and Hash-Based Block Matching.

This section describes variations of hash table construction and hash-based block matching for variable-size blocks. The variations of hash table construction and hash-based block matching can be used for motion estimation and/or BV estimation in real-time encoding scenarios when encoding screen capture content for a screen sharing application, desktop conferencing application, or other application, or the variations of hash table construction and hash-based block matching can be used for other encoding scenarios, types of content, or applications. In some cases, compared to prior approaches, the variations of hash table construction and hash-based block matching can significantly reduce the computational cost and memory cost of hash table construction, without hurting compression efficiency or the overall speed of encoding with hash-based block matching.

For example, for hash table construction, an encoder determines hash values for base-size candidate blocks in a reference picture. Each of the base-size candidate blocks in the reference picture has a base block size such N×N sample values. In a hash table, the encoder stores the hash values for the base-size candidate blocks in the reference picture.

For hash-based block matching, the encoder encodes a trial-size current block in a current picture. The trial-size current block has a trial block size such as N×N, 2N×2N, 4N×4N, 8N×8N, or 16N×16N sample values. In some cases, the trial-size current block has a trial block size larger than the base block size. As part of the encoding the trial-size current block, the encoder uses hash-based block matching, between base-size current block(s) of the trial-size current block and the base-size candidate blocks in the reference picture, to identify a trial-size matching block, if any, in the reference picture. For example, for a 4N×4N current block, the encoder uses hash-based block matching, between the 16 N×N current blocks of the 4N×4N current block and the N×N candidate blocks in the reference picture, to identify a 4N×4N matching block, if any, in the reference picture.

Instead of storing hash values for candidate blocks in a reference picture for each of the available block sizes, the encoder stores hash values only for the base-size candidate blocks in the reference picture. Compared to approaches that store hash values for all available block sizes, this can significantly reduce computational cost and memory cost for hash table construction because hash values are determined and stored for only one block size. At the same time, compression efficiency and overall encoding speed are not adversely affected. Although hash-based block matching operations may be slower (due to successive evaluation of base-size current blocks instead of evaluation of a single trial-size current block), increases in the computational cost of hash-based block matching tend to be offset by decreases in the computational cost of hash table construction.

For comparison to the example in the previous section, for each 4×4 candidate block in a reference picture, suppose the lower 16 bits of a 32-bit hash value provide a hash index, and the upper 16 bits of the 32-bit hash value provide a check value. Also suppose available block sizes are 4×4, 8×8, 16×16, 32×32, and 64×64. For the 4×4 block size, the encoder constructs a hash table with 65536 slots (since the hash index values have 16 bits, and $2^{16}$=65536). For each slot of the hash table, there is a list of candidate blocks that have the hash index value associated with the slot. Each entry for a candidate block includes six bytes of information—two bytes for a horizontal coordinate of the position in a reference picture, two bytes for a vertical coordinate of the position in the reference picture, and two bytes for the 16-bit check value. The total amount of memory for the 4×4 block size of candidate blocks in the reference picture is roughly w×h×6 bytes, where w and h are the width and the height of the reference picture. For a reference picture having 1080p resolution, w×h is roughly 2 million. Thus, for a reference picture having spatial resolution of 1080p, the total memory cost for the single hash table is roughly 12 million bytes, compared to 60 million bytes for the five hash tables in the previous approach. Further, constructing the single hash table for the 4×4 block size is faster than constructing hash tables for all of the available block sizes. Compression efficiency is essentially unchanged, however, since matching blocks found using multiple hash tables can still be found using the single hash table. On the other hand, hash-based block matching operations during motion estimation or BV estimation may be slower due to successive, hash-based block matching operations for 4×4 current blocks of a larger current block. Usually, however, increases in the computational cost of hash-based block matching operations are offset by decreases in the computational cost of hash table construction, such that overall encoding speed is not adversely affected.

1. Example Block Sizes for Base-Size Blocks and Trial-Size Blocks.

In some codec standards and formats, the size of a block for intra BC prediction or motion compensation is variable within a picture. For a current block being encoded, a block size is selected from among multiple available block sizes. The available block sizes, and hence the sizes possible for a current block being encoded, depend on implementation. In some example implementations, the available block sizes include N×N, 2N×2N, 4N×4N, 8N×8N, and 16N×16N sample values, where N is 4 or 8. Alternatively, the available block sizes include other and/or additional block sizes, such as rectangular block sizes or larger block sizes. Or, the available block sizes can include blocks of other shapes or even an arbitrary shape.

The base block size for base-size current blocks and base-size candidate blocks is typically the smallest possible size for prediction in motion compensation or intra BC prediction. In some example implementations, N×N is the smallest possible size for prediction in motion compensation or intra BC prediction. For example, N is 4. Alternatively, the base block size can have a value other than N×N, such as N/2×N or N×N/2. In any case, each of the available block sizes for the trial-size current block can be expressed as an arrangement of blocks having the base block size.

In some example implementations, the base block size relates to each of the available block sizes by a dyadic factor (e.g., ½, ¼ and ⅛) vertically and by dyadic factor (e.g., ½, ¼ and ⅛) horizontally. Thus, a trial-size current block can include 2 base-size current blocks, 4 base-size current blocks, 8 base-size current blocks, 16 base-size current blocks, 32 base-size current blocks, 64 base-size current blocks, or some other number of base-size current blocks.

FIG. 9 shows examples of options for different block sizes for a trial-size current block, together with N×N current blocks of the trial-size current block for hash-based block matching. Hash values for the N×N current blocks are also shown.

In FIG. 9, a 2N×2N current block (901) has four N×N current blocks. The hash values for two of the N×N current blocks are the same. A 4N×4N current block (902) has 16 N×N current blocks. The hash values for the top-left quadrant of four N×N current blocks are the same as for the 2N×2N current block (901). Finally, an 8N×8N current block (903) has 64 N×N current blocks. The hash values for the top-left quadrant of 16 N×N current blocks are the same as for the 4N×4N current block (902).

2. Example Matching Criteria for Trial-Size Blocks.

In hash-based block matching, an encoder attempts to find a trial-size candidate block in a reference picture that matches a trial-size current block. The encoder can use any of various matching criteria when determining whether a trial-size candidate block in a reference picture matches the trial-size current block in the current picture.

For example, according to an exact-hash-match criterion, the encoder identifies a trial-size candidate block for which every base-size candidate block matches a corresponding base-size current block (same offset) of the trial-size current block. (For example, a base-size candidate block matches a corresponding base-size current block when their hash index values match and their check values, if any, match. Alternatively, only a hash index value is considered (no check values) or results of sample-wise block matching are also considered.)

A trial-size candidate block matches the trial-size current block only if the base-size blocks at a first offset match, the base-size blocks at a second offset match, the base-size blocks at a third offset match, and so on, through the base-size blocks at the last offset.

FIG. 10 show an example (1000) of matching for a 2N×2N current block during hash-based block matching with N×N current blocks, according to an exact-hash-match criterion. For an N×N block in FIG. 10, the hash value represents a hash index and a check value. A 2N×2N current block (1010) has four N×N current blocks. The 2N×2N current block (1010) matches a 2N×2N candidate block (1020) because the hash values for corresponding base-size blocks match at every offset. Both base-size blocks at a zero-value offset have a hash value of $h_{5600}$. Both base-size blocks at an offset of one block horizontally have a hash value of $h_{6104}$. Both base-size blocks at an offset of one block vertically have a hash value of $h_{9299}$. Finally, both base-size blocks at an offset of one block horizontally and one block vertically have a hash value of $h_{9299}$.

In contrast, the 2N×2N current block (1010) does not match another 2N×2N candidate block (1030) because corresponding base-size blocks do not match at every offset. Corresponding base-size blocks having matching hash values at each of three offsets within the 2N×2N current block (1010) and the 2N×2N candidate block (1030), but the base-size blocks at the offset of one block horizontally and one block vertically have different hash values ($h_{9299}$ versus $h_{fab1}$). As such, the 2N×2N candidate block (1030) does not qualify as a match according to the exact-hash-match criterion. (The 2N×2N candidate block (1030) might qualify as a matching block according to a different criterion, e.g., a threshold-hash-match criterion.)

In FIG. 10, the 2N×2N current block (1010) also fails to match another 2N×2N candidate block (1040) because corresponding base-size blocks do not match at every offset. The other candidate block (1040) includes base-size blocks with the same hash values as the base-size blocks of the 2N×2N current block (1010), but the hash values are at different offsets for two of the base-size blocks. As such, the 2N×2N candidate block (1040) does not match according to the exact-hash-match criterion.

In contrast, according to a threshold-hash-match criterion, the encoder identifies a trial-size candidate block for which at least a threshold count of base-size candidate blocks match corresponding base-size current blocks (same offset) of the trial-size current block. This permits a small number of hash misses between corresponding base-size blocks. The threshold count can be expressed in terms of a threshold match count, with a trial-size candidate block matching only if at least the threshold match count of base-size blocks match. For example, the threshold match count is 1 or 2 base-size blocks less than the count of base-size blocks in a trial-size block. Or, as another example, the threshold match count can depend on trial block size, permitting more hash misses for larger trial block sizes. Alternatively, the threshold count can be expressed in terms of a threshold miss count, with a trial-size candidate block failing to match when the threshold count of hash misses is reached. For example, the threshold miss count is 2 or 3 base-size blocks. Or, as another example, the threshold miss count can depend on trial block size, increasing for larger trial block sizes.

The encoder can consider other criteria when determining whether a trial-size candidate block in a reference picture matches the trial-size current block in the current picture. For example, the encoder can evaluate a distortion cost, a rate cost, or a rate-distortion cost associated with using a trial-size candidate block for prediction. The distortion cost can be a sum-of-squared-difference metric or other metric, potentially considering the effects of quantization on reconstruction quality. The rate cost can measure a bit cost for residual values and/or a MV/BV value. The rate-distortion cost can combine a rate cost and distortion cost, weighting the rate cost relative to the distortion cost. In particular, the encoder can consider other criteria when selecting between multiple trial-size candidate blocks that satisfy a hash-match criterion.

3. Examples of Hash-Based Block Matching.

In some example implementations, hash-based block matching for a trial-size current block includes iterations of hash value evaluation for the respective base-size current blocks of the trial-size current block. In an iteration of the hash value evaluation, the encoder gets a hash value for a given one of the base-size current blocks of the trial-size current block. Based at least in part on the hash value for the given base-size current block, the encoder gets a set of base-size candidate blocks in the reference picture that match the given base-size current block. Then, based at least in part on the set of base-size candidate blocks, the encoder updates a set of trial-size candidate blocks in the reference picture. In particular, in later iterations of the hash value evaluation, the encoder can update the set of trial-size candidate blocks by pruning any of the trial-size candidate blocks that can no longer match the trial-size current block. After the iterations of hash value evaluation for the base-size current blocks of the trial-size current block, the encoder can identify the trial-size matching block in the reference picture (if any) from among any remaining trial-size candidate blocks, based at least in part on the quality of hash match with the trial-size current block.

Figure 11B:
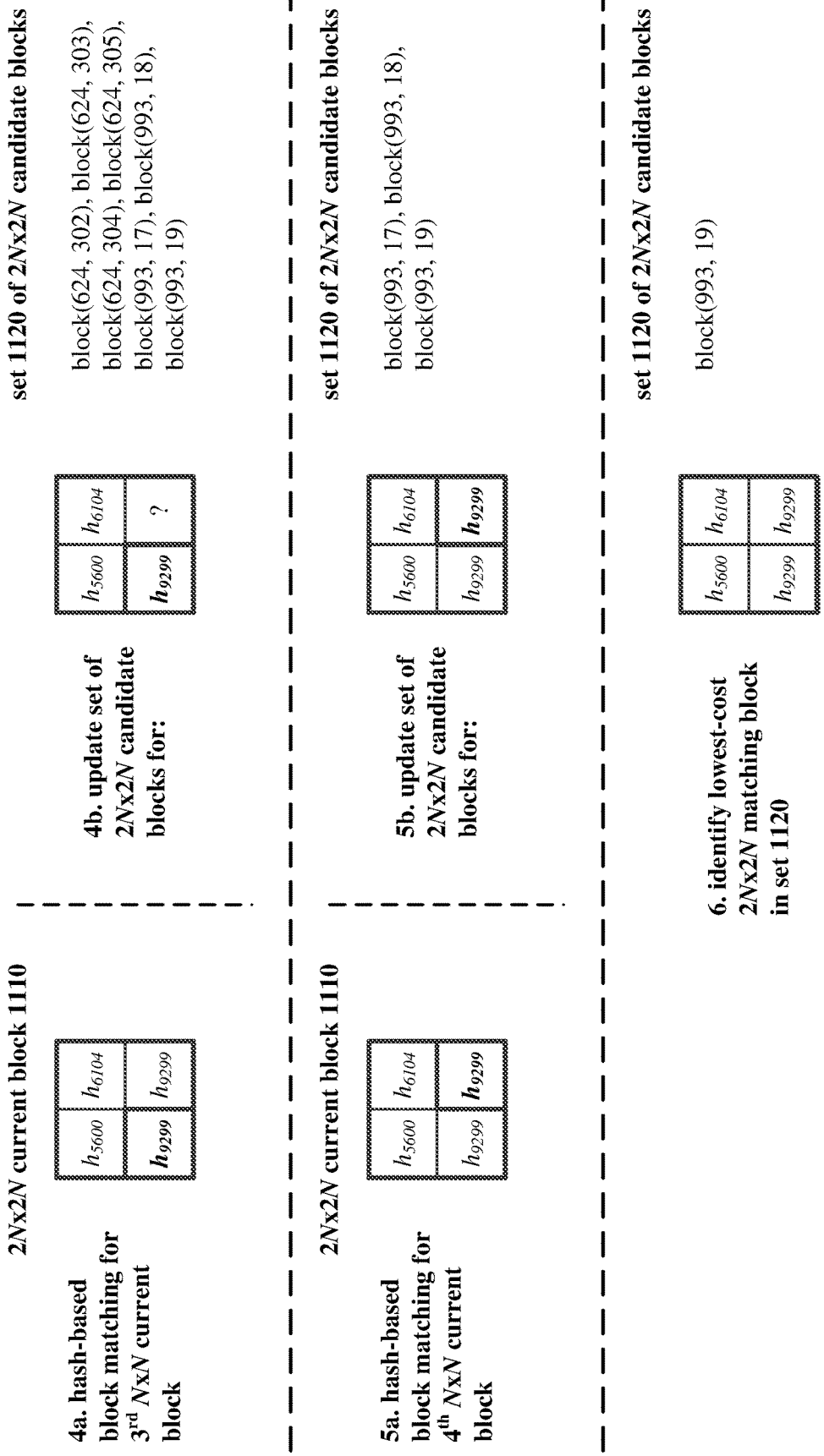

FIGS. 11a-11b show an example (1100) of encoding a 2N×2N current block in a current picture using hash-based block matching with four N×N current blocks of the 2N×2N current block, according to an exact-hash-match criterion. FIG. 12 shows details of updating a set of 2N×2N candidate blocks in one iteration of the hash value evaluation.

To start (stage 1), the encoder determines hash values for the four N×N current blocks of the 2N×2N current block (1110). For an N×N block in FIGS. 11a, 11b, and 12, the hash value represents a hash index and a check value.

Next (stage 2a), the encoder performs hash-based block matching for a first N×N current block of the 2N×2N current block (1110). The encoder gets the hash value for the first N×N current block, which is shown as hash value $h_{5600}$ for the top-left N×N current block. The encoder then gets a set of N×N candidate blocks in the reference picture that match the first N×N current block. For example, from a hash table, the encoder determines a list of N×N candidate blocks in the reference picture that have the same hash index as the first N×N current block, and then identifies any of the N×N candidate blocks in the list that also have the same check value as the first N×N current block.

Next (stage 2b), the encoder updates a set (1120) of 2N×2N candidate blocks that can match the 2N×2N current block (1110). As shown in FIG. 11a, within each of the 2N×2N candidate blocks in the set (1120) of 2N×2N candidate blocks, the top-left N×N candidate block (same offset as the first N×N current block) has a hash value of $h_{5600}$. The hash values for the remaining N×N candidate blocks have not yet been evaluated When evaluating the first N×N current block, the set (1120) of 2N×2N candidate blocks can be updated by initializing the set (1120) based on the set of N×N candidate blocks in the reference picture that match the first N×N current block. (For the top-left N×N block, the positions of the set of N×N candidate blocks are the same as the positions of the set (1120) of 2N×2N candidate blocks.) After the updating in stage 2b, the set (1120) of 2N×2N candidate blocks includes a large number of possibly-matching 2N×2N candidate blocks. FIG. 11a shows positions (horizontal, vertical coordinates) for some of the possibly-matching 2N×2N candidate blocks.

Next (stage 3a), the encoder performs hash-based block matching for a second N×N current block of the 2N×2N current block (1110). The encoder gets the hash value for the second N×N current block, which is shown as hash value $h_{6104}$ for the top-right N×N current block. The encoder then gets a set of N×N candidate blocks in the reference picture that match the second N×N current block. For example, from the hash table, the encoder determines a list of N×N candidate blocks in the reference picture that have the same hash index as the second N×N current block, and then identifies any of the N×N candidate blocks in the list that also have the same check value as the second N×N current block.

Next (stage 3b), the encoder updates the set (1120) of 2N×2N candidate blocks that can match the 2N×2N current block (1110). As shown in FIG. 11a, within each of the 2N×2N candidate blocks in the set (1120) of 2N×2N candidate blocks, the top-right N×N candidate block (same offset as the second N×N current block) has a hash value of $h_{6104}$. The hash values for the later N×N candidate blocks have not yet been evaluated The set (1120) of 2N×2N candidate blocks is updated by pruning any of the 2N×2N candidate blocks in the reference picture that can no longer match the 2N×2N current block (1110). After the updating in stage 3b, the set (1120) of 2N×2N candidate blocks includes fewer possibly-matching 2N×2N candidate blocks. FIG. 11a shows positions (horizontal, vertical coordinates) for some of the remaining 2N×2N candidate blocks that possibly match the 2N×2N current block (1110) after stage 3b.

Next (stage 4a), the encoder performs hash-based block matching for a third N×N current block of the 2N×2N current block (1110). The encoder gets the hash value for the third N×N current block, which is shown as hash value $h_{9299}$ for the bottom-left N×N current block. The encoder then gets a set of N×N candidate blocks in the reference picture that match the third N×N current block. For example, from the hash table, the encoder determines a list of N×N candidate blocks in the reference picture that have the same hash index as the third N×N current block, and then identifies any of the N×N candidate blocks in the list that also have the same check value as the third N×N current block.

Next (stage 4b), the encoder updates the set (1120) of 2N×2N candidate blocks that can match the 2N×2N current block (1110). As shown in FIG. 11b, within each of the 2N×2N candidate blocks in the set (1120) of 2N×2N candidate blocks, the bottom-left N×N candidate block (same offset as the third N×N current block) has a hash value of $h_{9299}$. The hash value for the later N×N candidate block has not yet been evaluated The set (1120) of 2N×2N candidate blocks is updated by pruning any of the 2N×2N candidate blocks in the reference picture that can no longer match the 2N×2N current block (1110). After the updating in stage 4b, the set (1120) of 2N×2N candidate blocks includes fewer possibly-matching 2N×2N candidate blocks. FIG. 11b shows positions (horizontal, vertical coordinates) for the seven remaining 2N×2N candidate blocks after stage 4b.

FIG. 12 shows an example (1200) of updating the set (1120) of 2N×2N candidate blocks during stage 4b. Before the updating, the set (1120) of 2N×2N candidate blocks includes 14 2N×2N candidate blocks (1210) at different positions. For each of the 14 2N×2N candidate blocks (1210), the hash values of the top-left N×N candidate block and top-right N×N candidate block match the hash values of the top-left N×N current block and top-right N×N current block, respectively. For seven of the 14 2N×2N candidate blocks (1210), the hash value of the bottom-left N×N candidate block matches the hash value of the bottom-left N×N current block. These seven 2N×2N candidate blocks are retained in the set (1120) of 2N×2N candidate blocks during stage 4b. For the other seven 2N×2N candidate blocks, the hash value of the bottom-left N×N candidate block does not match the hash value of the bottom-left N×N current block. These seven 2N×2N candidate blocks are pruned from the set (1120) of 2N×2N candidate blocks during stage 4b.

Returning to FIG. 11b, next (stage 5a), the encoder performs hash-based block matching for the fourth (and final) N×N current block of the 2N×2N current block (1110). The encoder gets the hash value for the fourth N×N current block, which is shown as hash value $h_{9299}$ for the bottom-right N×N current block. The encoder then gets a set of N×N candidate blocks in the reference picture that match the fourth N×N current block. For example, from the hash table, the encoder determines a list of N×N candidate blocks in the reference picture that have the same hash index as the fourth N×N current block, and then identifies any of the N×N candidate blocks in the list that also have the same check value as the fourth N×N current block.

Next (stage 5b), the encoder updates the set (1120) of 2N×2N candidate blocks that can match the 2N×2N current block (1110). As shown in FIG. 11b, within each of the 2N×2N candidate blocks in the set (1120) of 2N×2N candidate blocks, the bottom-right N×N candidate block (same offset as the fourth N×N current block) has a hash value of $h_{9299}$. The set (1120) of 2N×2N candidate blocks is updated by pruning any of the 2N×2N candidate blocks in the reference picture that can no longer match the 2N×2N current block (1110). After the updating in stage 5b, the set (1120) of 2N×2N candidate blocks includes fewer possibly-matching 2N×2N candidate blocks. FIG. 11b shows positions (horizontal, vertical coordinates) for the three remaining 2N×2N candidate blocks after stage 5b.

Finally (stage 6), the encoder identifies a lowest-cost 2N×2N candidate block in the set (1120) of 2N×2N candidate blocks. The lowest cost can be measured according to a rate cost, a distortion cost, or a rate-distortion cost. The lowest-cost 2N×2N candidate block is used as the matching block for the 2N×2N current block (1110). In FIG. 11b, the lowest-cost 2N×2N candidate block has a position of (993, 19) in the reference picture.

In the example of FIGS. 11a-11b, base-size current blocks of a trial-size current block of a are evaluated according to a raster scan pattern. Alternatively, the base-size current blocks can be evaluated according to some other pattern. In any case, the encoder can exit the hash value evaluation for the N×N current blocks of the 2N×2N current block (1110) if the set (1120) of 2N×2N candidate blocks is empty after an update.

In the example of FIGS. 11a-11b, hash value evaluation uses an exact-hash-match criterion. If, instead, the encoder uses a threshold-hash-match criterion, the encoder prunes a given 2N×2N candidate block from the set (1120) of 2N×2N candidate blocks during updating only when a threshold count of N×N candidate blocks (of the given 2N×2N candidate block) have failed a hash match with corresponding N×N current blocks of the 2N×2N current block (1110). 4. Example Techniques.

Figure 13:
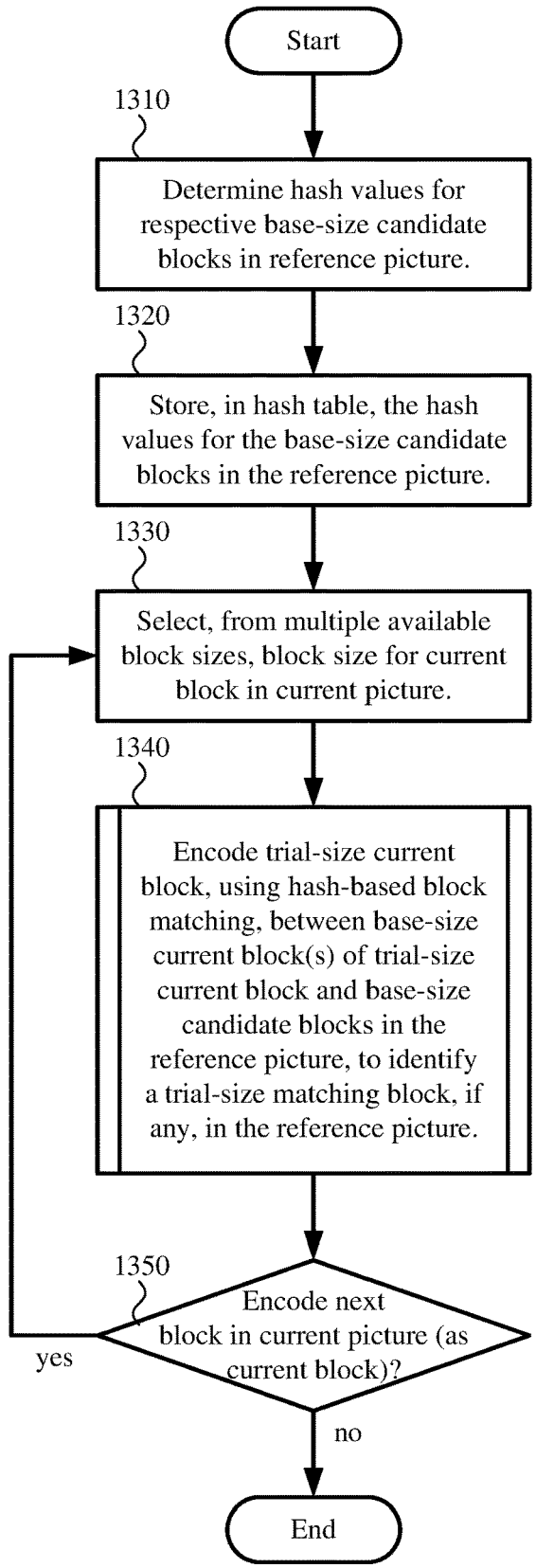
FIG. 13 is a flowchart illustrating a generalized technique for image or video encoding that includes encoding a trial-size current block using hash-based block matching with base-size current blocks of the trial-size current block.

FIG. 13 shows a generalized technique (1300) for image or video encoding that includes encoding a trial-size current block using hash-based block matching with base-size current blocks of the trial-size current block. A video encoder such as one described with reference to FIGS. 3, 4a, and 4b, or other encoder, can perform the technique (1300). The technique (1300) can be performed as part of a real-time encoding scenario or other encoding scenario, for screen capture content or another type of content.

FIG. 13 shows certain operations performed when encoding a current picture. The encoder can repeat the technique (1300) to encode other pictures of a sequence. Other operations performed during encoding (e.g., for other types of prediction, transform, quantization, entropy coding, reconstruction, etc.) are not shown in FIG. 13.

To start, the encoder determines (1310) hash values for respective base-size candidate blocks in a reference picture. Each of the base-size candidate blocks in the reference picture has a base block size. For example, the base block size is N×N sample values, where N is a whole number greater than 1, such as 2, 4, or 8. Alternatively, the base block size has some other size or shape (e.g., rectangular). In some example implementations, the encoder determines the hash values for the respective base-size candidate blocks in the reference picture using input sample values of the reference picture. Alternatively, the encoder can determine the hash values for the respective base-size candidate blocks in the reference picture using reconstructed sample values of the reference picture.

The hash values for the respective base-size candidate blocks in the reference picture are determined using one or more hash functions, which depend on implementation. For example, the encoder uses a CRC-32 hash function to determine the hash values for the respective base-size candidate blocks in the reference picture (and, later, base-size current blocks in the current picture being encoded). Alternatively, the hash function is another CRC hash function, a cryptographic hash function such as SHA or MD5, a hash function that uses averaging and XOR operations, a locality-sensitive hash function, or some other hash function.

In general, each of the hash values has i bits. The value of i depends on implementation. For example, i is 16, 32, or some other number of bits. In some example implementations, the i bits of a hash value include j bits that indicate an index of the hash table and k bits that indicate a check value. The values of j and k depend on implementation, and can be the same or different, but the values of j and k are set such that j+k=i, and $1<=j<=i$. For example, i is 32, j is 16, and k is 16. Or, as another example, i is 16, j is 12, and k is 4. Or, as another example, i is 16, j is 8, and k is 8. The value of k can be zero, in which case the j-bit hash index is the same as the i-bit hash value, and there is no check value. An index of the hash table and a check value can be determined by splitting a single hash value (e.g., splitting a 32-bit hash value) determined using a single hash function. Alternatively, an index of the hash table and a check value can be determined using different hash functions, with the index of the hash table and the check value collectively providing the hash value for a block.

The encoder stores (1320), in a hash table, the hash values for the base-size candidate blocks in the reference picture. For example, the hash table is a hash table organized and implemented as described in section IV.B. Alternatively, the hash table is organized and implemented in some other way. In particular, even when variable-size blocks are used during encoding, hash values for candidate blocks having a block size larger than the base block size are not determined or stored as part of the image encoding or video encoding, which significantly simplifies the process of hash table construction and significantly reduces the memory cost for the hash table.

The encoder then encodes blocks in the current picture. For a current block in the current picture, the encoder selects (1330) a block size from among multiple available block sizes. The multiple available block sizes can include multiple block sizes larger than the base block size (e.g., 2N×2N, 4N×4N, 8N×8N, 16N×16N, compared to a base block size of N×N), in addition to including the base block size. Alternatively, the multiple available block sizes can exclude the base block size.

The encoder encodes (1340) the trial-size current block in the current picture. When the block size of the trial-size current block (trial block size) is the same as the base block size, the encoder uses hash-based block matching, between the base-size current block and the base-size candidate blocks in the reference picture, to identify a trial-size (here, base-size) matching block, if any, in the reference picture. When the trial block size is larger than the base block size, the encoder uses hash-based block matching, between base-size current blocks of the trial-size current block and the base-size candidate blocks in the reference picture, to identify a trial-size matching block, if any, in the reference picture. For example, if the base block size is N×N sample values and the trial block size is 2N×2N sample values, the trial-size current block has four base-size current blocks that may be used in hash-based block matching. If the base block size is N×N sample values and the trial block size is 4N×4N sample values, the trial-size current block has 16 base-size current blocks that may be used in hash-based block matching. If the base block size is N×N sample values and the trial block size is 8N×8N sample values, the trial-size current block has 64 base-size current blocks that may be used in hash-based block matching.

Figure 14:
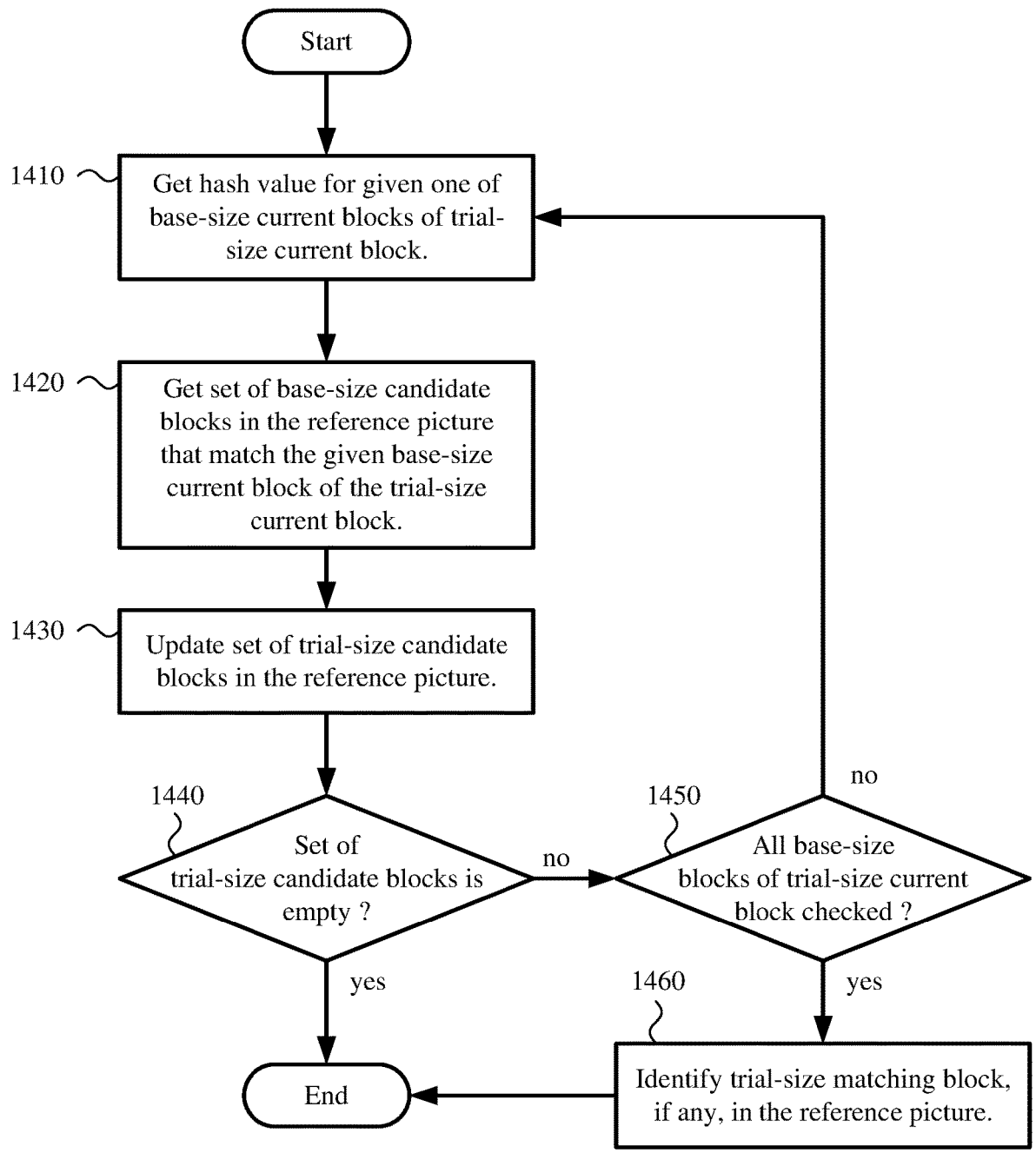
FIG. 14 is a flowchart illustrating an example technique for hash-based block matching with base-size current blocks of a trial-size current block.

FIG. 14 details one example approach (1400) for performing hash-based block matching as part of the encoding (1340) of the trial-size current block. In FIG. 14, the encoder performs operations for each of the respective base-size current block(s) of the trial-size current block during hash value evaluation. The encoder performs operations for one of the base-size current block(s) of the trial-size current block in an iteration of the hash value evaluation. The encoder can evaluate different base-size current blocks in a raster scan pattern or according to some other pattern. The encoder can exit the hash value evaluation before evaluating all of the base-size current block(s) of the trial-size current block, if hash-based block matching fails to find a trial-size matching block for the trial-size current block.

The encoder determines hash values for the base-size current blocks of the trial-size current block, using the same hash function(s) used to determine hash values for the base-size candidate blocks in the reference picture. The encoder determines the hash values for the respective base-size current blocks of trial-size current block using input sample values of the trial-size current block. The encoder can determine the hash values for all of the base-size current blocks of the trial-size current block before any iterations of the hash value evaluation. Or, the encoder can determine the hash value for a given base-size current block of the trial-size current block as part of an iteration of the hash value evaluation.

With reference to FIG. 14, in an iteration of the hash value evaluation, the encoder gets (1410) a hash value for a given base-size current block among the base-size current blocks of the trial-size current block.

In the iteration of the hash value evaluation, based at least in part on the hash value for the given base-size current block of the trial-size current block, the encoder gets (1420) a set of base-size candidate blocks in the reference picture that match the given base-size current block of the trial-size current block. For example, the encoder uses a hash index, which is based at least in part on the hash value for the given base-size current block, to determine a list of base-size candidate blocks in the reference picture having the hash index. The hash index for the given base-size current block indicates a slot in the hash table, which stores the hash values for the base-size candidate blocks. When the hash values include check values, the encoder can use a check value for the given base-size current block to determine, from the list of base-size candidate blocks in the reference picture having the hash index, the set of base-size candidate blocks in the reference picture that match the given base-size current block. Alternatively (with or without use of check values), the encoder can use block matching to determine, from the list of base-size candidate blocks in the reference picture having the hash index, the set of base-size candidate blocks in the reference picture that match the given base-size current block. The encoder can also check which of the list of base-size candidate blocks in the reference picture is available for use, based on position within the reference picture. Any of the base-size candidate blocks in the list that are not available for use (e.g., because they are in a different tile or slice, or because they include content not yet reconstructed) can be removed from the set of base-size candidate blocks in the reference picture that match the given base-size current block.

Continuing the iteration of the hash value evaluation, based at least in part on the set of base-size candidate blocks in the reference picture (that match the given base-size current block of the trial-size current block), the encoder updates (1430) a set of trial-size candidate blocks in the reference picture. For example, when the iteration of the hash value evaluation is an initial iteration for the trial-size current block, the encoder initializes the set of trial-size candidate blocks in the reference picture based on the set of base-size candidate blocks in the reference picture that match the given base-size current block. (In some example implementations, the first base-size current block to be evaluated is in the top-left corner of the trial-size current block, such that the location of a matching base-size current block also provides the location of a trial-size candidate block.) On the other hand, when the iteration of the hash value evaluation is after an initial iteration for the trial-size current block, the encoder updates the set of trial-size candidate blocks in the reference picture by pruning any of the trial-size candidate blocks that can no longer match the trial-size current block.

The given base-size current block of the trial-size current block has an offset within the trial-size current block. In some example implementations, a trial-size matching block in the reference picture can match the trial-size current block only if hash values for all corresponding base-size blocks match. In such implementations, the encoder can remove, from the set of trial-size candidate blocks in the reference picture, any of the trial-size candidate blocks in which a base-size candidate block at the same offset (within the trial-size candidate block) is not in the set of base-size candidate blocks in the reference picture that match the given base-size current block.

In other example implementations, a trial-size matching block in the reference picture can match the trial-size current block even if hash values do not match for all corresponding base-size blocks. In such implementations, each of the trial-size candidate blocks has a threshold miss count for non-matching base-size candidate blocks. The encoder can adjust the threshold miss count for any of the trial-size candidate blocks in which a base-size candidate block at the same offset (within that trial-size candidate block) is not in the set of base-size candidate blocks in the reference picture that match the given base-size current block. The encoder prunes any of the trial-size candidate blocks for which the threshold miss count reaches a defined value. For example, the threshold miss count has an initial value such as 2 or 3, and the encoder adjusts the threshold miss count by decrementing it. The encoder prunes a trial-size candidate block when its threshold miss count reaches zero (defined value). Or, as another example, the threshold miss count has an initial value of zero, and the encoder adjusts the threshold miss count by incrementing it. The encoder prunes a trial-size candidate block when its threshold miss count reaches a defined value such as 2 or 3. The threshold miss count can vary depending on block size, e.g., to be smaller for a small block size with fewer base-size blocks, and to be larger for a larger block size with more base-size blocks.

With reference to FIG. 14, after updating the set of trial-size candidate blocks in the reference picture, the encoder checks one or more exit conditions. The encoder checks (1440) whether the set of trial-size candidate blocks in the reference picture is empty, e.g., because no trial-size candidate blocks were ever found or because all trial-size candidate blocks have been pruned. The encoder selectively exits the hash value evaluation depending on whether the set of trial-size candidate blocks in the reference picture is empty. If the set of trial-size candidate blocks in the reference picture is empty, the hash value evaluation ends. Otherwise (the set of trial-size candidate blocks in the reference picture is not empty), the encoder checks (1450) whether hash-based block matching has been performed for all of the base-size current blocks of the trial-size current block. The encoder selectively exits the hash value evaluation depending on whether hash-based block matching has been performed for all of the base-size current blocks of the trial-size current block. If at least one base-size current block remains to be evaluated, the encoder gets (1410) the hash value for the next base-size current block and continues in another iteration of the hash value evaluation.

After hash value evaluation is completed for all of the base-size current blocks of the trial-size current block, the encoder identifies (1460) a trial-size matching block, if any, in the reference picture for the trial-size current block. The encoder can identify the trial-size matching block in the reference picture, from among any remaining trial-size candidate blocks in the set of trial-size candidate blocks in the reference picture, based at least in part on the quality of hash match with the trial-size current block (e.g., whether all base-size blocks match between the trial-size candidate block and trial-size current block, or whether there are at least a threshold count of matching base-size blocks between the trial-size candidate block and trial-size current block, or how many base-size blocks match between the trial-size candidate block and trial-size current block). The encoder can also consider one or more other factors when identifying the trial-size matching block in the reference picture, from among any remaining trial-size candidate blocks in the set of trial-size candidate blocks. For example, the encoder can consider a rate cost (such as a cost of signaling a vector that indicates a displacement to the trial-size matching block and/or cost of signaling residual values when the trial-size matching block is used for prediction), a distortion cost (such as a measure of reconstruction quality when the trial-size matching block is used for prediction), or a rate-distortion cost.

As previously noted, in some example implementations, a trial-size matching block in the reference picture can match the trial-size current block only if hash values for all corresponding base-size blocks match. In such implementations, for the trial-size matching block in the reference picture, each of the base-size current blocks of the trial-size current block (being at an offset in the trial-size current block) has a base-size matching block (among the base-size candidate blocks in the reference picture) at the same offset in the trial-size matching block. In other example implementations, a trial-size matching block in the reference picture can match the trial-size current block even if hash values do not match for all corresponding base-size blocks. In such implementations, for the trial-size matching block in the reference picture, each of at least a threshold match count of the base-size current blocks of the trial-size current block (being at an offset in the trial-size current block) has a base-size matching block (among the base-size candidate blocks in the reference picture) at the same offset in the trial-size matching block. For example, the threshold match count is one or two less than an overall count of the base-size current blocks of the trial-size current block.

Alternatively, the encoder can use another approach for performing hash-based block matching as part of the encoding (1340) of the trial-size current block. For example, the encoder can perform operations to retrieve candidate block lists concurrently for different base-size current blocks and perform updating operations in a different order for the set of trial-size candidate blocks.

Returning to FIG. 13, in addition to encoding the trial-size current block with the selected block size, the encoder can evaluate one or more other possible block sizes for the current block (not shown in FIG. 13). In this case, the encoder can repeat the selection (1330) of a block size for the current block and the encoding (1340) of the trial-size current block with the other selected block size. The encoder can then compare results of encoding the current block with different block sizes, before selecting a final block size for the current block.

When the encoder has finished encoding the current block, the encoder checks (1350) whether there are any more blocks to encode in the current picture. If so ("yes" path), the encoder selects (1330) a block size for the next block in the current picture, which is encoded as the current block. The selected block sizes can be different for different blocks in the current picture (variable block size). Otherwise ("no" path), the encoder finishes encoding for the current picture.

The approach shown in FIG. 13 can be used for motion estimation or BV estimation. When the encoding (1340) of the trial-size current block uses intra BC prediction, the reference picture is the current picture. When the encoding (1340) of the trial-size current block uses motion compensation, the reference picture is a previous picture different than the current picture. The motion estimation and motion compensation can use a single reference picture for the current picture or use multiple reference pictures for the current picture. If multiple reference pictures are available for the current picture, different hash tables can be constructed and used for hash-based block matching against candidate blocks in the respective reference pictures.

In some example implementations, for each of the base-size candidate blocks in the reference picture and for each of the base-size current blocks of the trial-size current block, the block is a block of a primary color component (e.g., luma component), and the hash value for the block is determined using sample values of the primary color component. Even so, a MV or BV value found by the encoder can be used for other, collocated blocks of a unit. In that sense, the hash value determined for a block of primary color component is also for the collocated blocks of secondary color components. In alternative example implementations, for each of the base-size candidate blocks in the reference picture and for each of the base-size current blocks of the trial-size current block, the hash value for the block is also determined using sample values of the collocated block of the secondary color components. Alternatively, different hash values are determined for different color components. For example, for each of the base-size candidate blocks in the reference picture and for each of the base-size current blocks of the trial-size current block, the block can be a block of a secondary color component (e.g., chroma component), and the hash value for the block can be determined using sample values of the secondary color component.

5. Alternatives and Variations.

This section describes various alternatives to previously-described examples and variations of previously-described examples.

Types of content. In many of the examples described herein, operations are described as being performed by a video encoder when encoding screen capture content. The screen capture content can be separate from other types of video content or mixed with other types of video content in different sections of pictures. Approaches to hash-based block matching described herein are particularly well-suited for encoding screen capture content. Alternatively, operations described herein can be performed by a video encoder when encoding some other type of video content (e.g., animation or other synthetic video content; natural, camera video content).

Types of encoders. In many of the examples described herein, operations are described as being performed by a video encoder. Alternatively, operations described herein for hash table construction and hash-based block matching during intra BV estimation can be performed by an image encoder. More generally, operations described herein for hash table construction and hash-based block matching can be performed by another type of media encoder for another type of graphical or visual media content.

Encoding scenarios. Approaches to hash table construction and hash-based block matching described herein are particularly well-suited for real-time encoding scenarios. In real-time encoding scenarios, faster hash table construction improves performance. Alternatively, approaches described herein can be used in other encoding scenarios (such as offline encoding, transcoding). In such other scenarios, reduced memory consumption for hash tables also improves performance.

Hardware-accelerated implementations. Approaches to hash table construction and hash-based block matching described herein can be implemented using software executable on a general-purpose CPU. Some CPUs provide direct support for hash functions such as CRC-32 hash functions. Alternatively, approaches described herein can be implemented using GPU hardware, which can take advantage of opportunities for parallel processing in motion estimation or computation of hash values for candidate blocks in a reference picture, or special-purpose hardware.

Ways to limit hash table size. In some example implementations, the number of candidate blocks per hash index value can be reduced by eliminating redundant, identical blocks with that hash index value and/or by screening out candidate blocks with certain patterns. In some example implementations, such operations are not performed because they limit the number of available base-size candidate blocks and hence may disqualify some trial-size matching blocks in unanticipated ways, but such operations can be performed to limit hash table size.

For example, as described in U.S. Pat. No. 1,056,775, before adding a new candidate block to the hash table, the encoder can check if there is already a candidate block represented in the hash table that is identical to the new candidate block. If the hash table already includes a previous candidate block that is identical to the new candidate block, then the new candidate block is added instead of the previous candidate block, or the previous candidate block is simply retained. If the hash table does not include a candidate block that is identical to the new candidate block, then the new candidate block is added to the hash table. Reducing the size of the hash table by eliminating identical blocks can hurt compression efficiency. When multiple identical candidate blocks are potentially available, they may result in different MV or BV values for a current block, where one of the MV or BV values can be encoded with fewer bits than the other(s). Also, candidate blocks that have identical input sample values (and hence the same hash value) may have different reconstructed values, in which case using one of the candidate blocks may result in better prediction than using the other(s). If only one of the multiple identical candidate blocks is retained in the hash table, the encoder could miss a better option for a reference block. Thus, by deciding whether to eliminate identical blocks, the encoder can trade off memory size for the data structure and compression efficiency.

Another option for reducing the size of a hash table is to screen out candidate blocks with certain patterns (i.e., not add such candidate blocks to the hash table). For example, the encoder can screen out candidate blocks that have very simple patterns such as uniform sample values, rows of uniform sample values or columns of uniform sample values. More generally, the encoder can screen out candidate blocks that fail a complexity criterion. In most cases, a block with such a pattern can be predicted efficiently using intra spatial prediction, without intra BC prediction. While reducing the size of hash tables, this can hurt compression efficiency.

Signaling of MV or BV values. In some of the examples described herein, an MV or BV value for a current block is encoded and output when the current block is encoded using hash-based block matching. The MV or BV value for the block can be signaled at the syntax level of a unit that includes the block. Other blocks (e.g., collocated chroma blocks) in the unit can use the same MV or BV value, or a scaled version thereof. Or, other blocks in the unit can use separately-signaled MV or BV values. More generally, the MV or BV value for a block is signaled at an appropriate syntax level for the block.

Signaling hash values instead of MV or BV values. In some of the examples described herein, an MV or BV value for a current block is encoded and output when the current block is encoded using hash-based block matching. Alternatively, instead of outputting an MV or BV value for the matching block for a current block, an encoder outputs the hash value of the matching block that represents the current block. An encoder calculates hash values based on reconstructed sample values. A decoder, using the signaled hash value, reconstructs the current block using its own hash table that organizes candidate blocks according to hash value. In this approach, the decoder creates and updates a hash table that organizes the candidate blocks, using reconstructed sample values to determine hash values for the candidate blocks. Using the signaled hash value for the current block, the decoder finds the appropriate block in the hash table, then uses that block for the current block.

Determining hash value for set of collocated blocks. In some of the examples described herein, an encoder determines hash values for blocks in a single color component (e.g., a primary color component), whether the blocks are candidate blocks in a reference picture or current blocks being encoding. The encoder determines the hash value for a block of the primary color component using the sample values of the primary color component. For example, the encoder determines hash values for blocks of a luma component, finds MV or BV values for the blocks of the luma component, and re-uses the MV or BV values (or scaled versions thereof) for the blocks of chroma components. Thus, the hash values for the blocks of the primary color component are also for the blocks of the secondary color components. In some alternative implementations, the hash values for the blocks are also determined using the sample values of the secondary color components. In this way, the encoder can incorporate sample values from the primary and secondary components when finding a matching block for a current block being encoded, and then use the resulting MV or BV value for the primary and secondary color components of the unit.

Performance of prediction operations. Block copying operations for prediction during intra BC prediction or motion compensation mode can be performed at the level of a block. Or, block copying operations for prediction during intra BC prediction or motion compensation mode can be performed at the level of smaller blocks within a block (e.g., smaller blocks corresponding to transform blocks), even when the MV or BV value is signaled for the block or unit that includes the block.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that includes one or more processors and memory, a method of image encoding or video encoding, the method comprising:
   determining hash values for respective base-size candidate blocks in a reference picture, each of the base-size candidate blocks in the reference picture having a base block size;
   storing the hash values for the base-size candidate blocks in the reference picture; and
   encoding a trial-size current block in a current picture, the trial-size current block having a trial block size larger than the base block size, wherein the encoding the trial-size current block uses hash-based block matching, between base-size current blocks of the trial-size current block and the base-size candidate blocks in the reference picture, to identify a trial-size matching block, if any, in the reference picture, and wherein the hash-based block matching includes, in an iteration of hash value evaluation:
      getting a hash value for a given base-size current block among the base-size current blocks of the trial-size current block;
      based at least in part on the hash value for the given base-size current block of the trial-size current block, getting a set of base-size candidate blocks in the reference picture that match the given base-size current block of the trial-size current block; and based at least in part on the set of base-size candidate blocks in the reference picture that match the given base-size current block of the trial-size current block, updating a set of trial-size candidate blocks in the reference picture.

2. The method of claim 1, wherein the encoding the trial-size current block uses intra block copy prediction, the reference picture being the current picture.

3. The method of claim 1, wherein the encoding the trial-size current block uses motion compensation, the reference picture being a previously encoded picture different than the current picture.

4. The method of claim 1, further comprising:
before any iterations of the hash value evaluation, determining the hash values for all of the base-size current blocks of the trial-size current block; or
as part of the iteration of the hash value evaluation, determining the hash value for the given base-size current block of the trial-size current block.

5. The method of claim 1, wherein the updating the set of trial-size candidate blocks in the reference picture includes, when the iteration of the hash value evaluation is after an initial iteration for the trial-size current block:
pruning, from the set of trial-size candidate blocks in the reference picture, any of the trial-size candidate blocks that can no longer match the trial-size current block.

6. The method of claim 5, wherein the given base-size current block of the trial-size current block has an offset within the trial-size current block, and wherein the pruning removes, from the set of trial-size candidate blocks in the reference picture, any of the trial-size candidate blocks in which a base-size candidate block at the offset, within the trial-size candidate block, is not in the set of base-size candidate blocks in the reference picture that match the given base-size current block of the trial-size current block.

7. The method of claim 5, wherein the given base-size current block of the trial-size current block has an offset within the trial-size current block, and wherein the updating the set of trial-size candidate blocks in the reference picture further includes:
adjusting a threshold miss count for any of the trial-size candidate blocks in which a base-size candidate block at the offset, within that trial-size candidate block, is not in the set of base-size candidate blocks in the reference picture that match the given base-size current block of the trial-size current block, wherein any of the trial-size candidate blocks for which the threshold miss count reaches a defined value is pruned.

8. The method of claim 1, further comprising, in the iteration of the hash value evaluation:
checking whether the set of trial-size candidate blocks in the reference picture is empty; and
selectively exiting the hash value evaluation depending on whether the set of trial-size candidate blocks in the reference picture is empty.

9. The method of claim 1, further comprising, in the iteration of the hash value evaluation:
checking whether hash-based block matching has been performed for all of the base-size current blocks of the trial-size current block; and
selectively exiting the hash value evaluation depending on whether hash-based block matching has been performed for all of the base-size current blocks of the trial-size current block.

10. The method of claim 1, wherein, after the hash value evaluation, the trial-size matching block in the reference picture is identified, from among any remaining trial-size candidate blocks in the set of trial-size candidate blocks in the reference picture, based at least in part on quality of hash match with the trial-size current block.

11. The method of claim 10, wherein the trial-size matching block in the reference picture is also identified based at least in part on a rate cost, a distortion cost, or a rate-distortion cost associated with using the trial-size matching block for prediction.

12. The method of claim 1, wherein, for the trial-size matching block in the reference picture, each of the base-size current blocks of the trial-size current block, being at an offset in the trial-size current block, has a base-size matching block, among the base-size candidate blocks in the reference picture, at the offset in the trial-size matching block.

13. The method of claim 1, wherein, for the trial-size matching block in the reference picture, each of at least a threshold match count of the base-size current blocks of the trial-size current block, being at an offset in the trial-size current block, has a base-size matching block, among the base-size candidate blocks in the reference picture, at the offset in the trial-size matching block.

14. The method of claim 1, wherein the base block size is N×N sample values, and wherein:
the trial block size is 2N×2N sample values, the trial-size current block having 4 base-size current blocks;
the trial block size is 4N×4N sample values, the trial-size current block having 16 base-size current blocks; or
the trial block size is 8N×8N sample values, the trial-size current block having 64 base-size current blocks.

15. The method of claim 1, wherein each of the hash values has i bits, the i bits including j bits that indicate an index of a hash table and k bits that indicate a check value.

16. The method of claim 15, wherein the index of the hash table and the check value are determined using a single hash function.

17. The method of claim 1, wherein the method is performed as part of a real-time encoding scenario.

18. A computer system comprising one or more processors and memory, the computer system implementing an image encoder system or video encoder system comprising:
a buffer configured to store a reference picture; and
an encoder configured to perform operations comprising:
determining hash values for respective base-size candidate blocks in the reference picture, each of the base-size candidate blocks in the reference picture having a base block size;
storing the hash values for the base-size candidate blocks in the reference picture; and
encoding a trial-size current block in a current picture, the trial-size current block having a trial block size larger than the base block size, wherein the encoding the trial-size current block uses hash-based block matching, between base-size current blocks of the trial-size current block and the base-size candidate blocks in the reference picture, to identify a trial-size matching block, if any, in the reference picture, and wherein the hash-based block matching includes, in an iteration of hash value evaluation:
getting a hash value for a given base-size current block among the base-size current blocks of the trial-size current block;
based at least in part on the hash value for the given base-size current block of the trial-size current block, getting a set of base-size candidate blocks in the reference picture that match the given base-size current block of the trial-size current block; and based at least in part on the set of base-size candidate blocks in the reference picture that match the given base-size current block of the trial-size current block, updating a set of trial-size candidate blocks in the reference picture.

19. One or more computer-readable media having stored therein computer-executable instructions for causing one or more processors, when programmed thereby, to perform encoding operations, the one or more computer-readable media being selected from the group consisting of non-volatile storage, non-volatile memory, and volatile memory, and the one or more computer-readable media not consisting of only a transitory propagating signal or carrier wave, the encoding operations comprising:

determining hash values for respective base-size candidate blocks in a reference picture, each of the base-size candidate blocks in the reference picture having a base block size;

storing the hash values for the base-size candidate blocks in the reference picture; and encoding a trial-size current block in a current picture, the trial-size current block having a trial block size larger than the base block size, wherein the encoding the trial-size current block uses hash-based block matching, between base-size current blocks of the trial-size current block and the base-size candidate blocks in the reference picture, to identify a trial-size matching block, if any, in the reference picture, and wherein the hash-based block matching includes, in an iteration of hash value evaluation:

getting a hash value for a given base-size current block among the base-size current blocks of the trial-size current block;

based at least in part on the hash value for the given base-size current block of the trial-size current block, getting a set of base-size candidate blocks in the reference picture that match the given base-size current block of the trial-size current block; and based at least in part on the set of base-size candidate blocks in the reference picture that match the given base-size current block of the trial-size current block, updating a set of trial-size candidate blocks in the reference picture.

20. The one or more computer-readable media of claim 19, wherein the updating the set of trial-size candidate blocks in the reference picture includes, when the iteration of the hash value evaluation is after an initial iteration for the trial-size current block:

pruning, from the set of trial-size candidate blocks in the reference picture, any of the trial-size candidate blocks that can no longer match the trial-size current block.

21. The one or more computer-readable media of claim 19, wherein the hash-based block matching further includes, in the iteration of the hash value evaluation:

checking whether the set of trial-size candidate blocks in the reference picture is empty; and selectively exiting the hash value evaluation depending on whether the set of trial-size candidate blocks in the reference picture is empty.

22. The one or more computer-readable media of claim 19, wherein the hash-based block matching further includes, in the iteration of the hash value evaluation:

checking whether hash-based block matching has been performed for all of the base-size current blocks of the trial-size current block; and selectively exiting the hash value evaluation depending on whether hash-based block matching has been performed for all of the base-size current blocks of the trial-size current block.

23. The one or more computer-readable media of claim 19, wherein the encoding the trial-size current block further includes, after the hash value evaluation, identifying the trial-size matching block in the reference picture, from among any remaining trial-size candidate blocks in the set of trial-size candidate blocks in the reference picture, based at least in part on quality of hash match with the trial-size current block.

24. The computer system of claim 18, wherein the updating the set of trial-size candidate blocks in the reference picture includes, when the iteration of the hash value evaluation is after an initial iteration for the trial-size current block:

pruning, from the set of trial-size candidate blocks in the reference picture, any of the trial-size candidate blocks that can no longer match the trial-size current block.

25. The computer system of claim 18, wherein the hash-based block matching further includes, in the iteration of the hash value evaluation:

checking whether the set of trial-size candidate blocks in the reference picture is empty; and selectively exiting the hash value evaluation depending on whether the set of trial-size candidate blocks in the reference picture is empty.

26. The computer system of claim 18, wherein the hash-based block matching further includes, in the iteration of the hash value evaluation:

checking whether hash-based block matching has been performed for all of the base-size current blocks of the trial-size current block; and selectively exiting the hash value evaluation depending on whether hash-based block matching has been performed for all of the base-size current blocks of the trial-size current block.

27. The computer system of claim 18, wherein the encoding the trial-size current block further includes, after the hash value evaluation, identifying the trial-size matching block in the reference picture, from among any remaining trial-size candidate blocks in the set of trial-size candidate blocks in the reference picture, based at least in part on quality of hash match with the trial-size current block.

* * * * *